(12) United States Patent
Reisch et al.

(10) Patent No.: US 12,083,879 B2
(45) Date of Patent: Sep. 10, 2024

(54) TRANSMISSION, DRIVE TRAIN AND VEHICLE COMPRISING TRANSMISSION

(71) Applicant: ZF Friedrichshafen AG, Friedrichshafen (DE)

(72) Inventors: Matthias Reisch, Ravensburg (DE); Stefan Beck, Eriskirch (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 113 days.

(21) Appl. No.: 17/771,753

(22) PCT Filed: Oct. 22, 2020

(86) PCT No.: PCT/EP2020/079808
§ 371 (c)(1),
(2) Date: Apr. 25, 2022

(87) PCT Pub. No.: WO2021/078892
PCT Pub. Date: Apr. 29, 2021

(65) Prior Publication Data
US 2022/0402359 A1    Dec. 22, 2022

(30) Foreign Application Priority Data
Oct. 25, 2019   (DE) .................. 102019216507.9

(51) Int. Cl.
*B60K 17/356* (2006.01)
*B60K 17/04* (2006.01)
(Continued)

(52) U.S. Cl.
CPC .......... *B60K 17/356* (2013.01); *B60K 17/046* (2013.01); *B60K 17/3467* (2013.01);
(Continued)

(58) Field of Classification Search
CPC ................. F16H 1/46; F16H 2001/289; F16H 2048/104; F16H 2048/106; B60K 17/16
See application file for complete search history.

(56) References Cited

U.S. PATENT DOCUMENTS 11,255,419 B2 *   2/2022   Lindtner ................. F16H 48/10

FOREIGN PATENT DOCUMENTS

| CN | 0109707815 A | 5/2019 |
|----|--------------|--------|
| DE | 401652 | 9/1924 |

(Continued)

OTHER PUBLICATIONS

International Search Report and Written Opinion of the International Search Authority mailed Jan. 27, 2021 in International Application No. PCT/EP2020/079808 (English and German languages) (32 pp.).

(Continued)

*Primary Examiner* — Huan Le
(74) *Attorney, Agent, or Firm* — Crowell & Moring LLP

(57) ABSTRACT

A transmission may include an input shaft, a first output shaft, a second output shaft, a first planetary gearset, and a second planetary gearset connected to the first planetary gearset, where the planetary gearsets each comprise numerous elements. The input shaft, the two output shafts, the planetary gearsets, and their elements may be arranged and designed such that a torque input via the input shaft is converted and distributed in a defined ratio to the two output shafts, and the formation of a combined torque is prevented. At least a third element of the first planetary gearset may be connected to a first element of the second planetary gearset via a shaft for conjoint rotation.

19 Claims, 29 Drawing Sheets

(51) Int. Cl.
*B60K 17/346* (2006.01)
*F16H 3/52* (2006.01)
*F16H 37/08* (2006.01)

(52) U.S. Cl.
CPC ............. *F16H 3/52* (2013.01); *F16H 37/082* (2013.01); *F16H 2200/0021* (2013.01); *F16H 2200/2007* (2013.01)

(56) References Cited

FOREIGN PATENT DOCUMENTS

| | | |
|---|---|---|
| DE | 26 20 570 | 11/1977 |
| DE | 42 16 397 A1 | 11/1993 |
| DE | 103 23 254 A1 | 12/2004 |
| DE | 10 2004 003 632 A1 | 8/2005 |
| DE | 10 2011 079 975 A1 | 1/2013 |
| DE | 10 2018 112 880 A1 | 12/2018 |
| DE | 10 2017 223 019 A1 | 6/2019 |
| WO | WO 2005/120877 A1 | 12/2005 |
| WO | WO 2019/020280 A1 | 1/2019 |

OTHER PUBLICATIONS

First Office Action (including Search Report) in Chinese Application No. 202080061100.9, dated Dec. 28, 2023 (10 pages).

\* cited by examiner

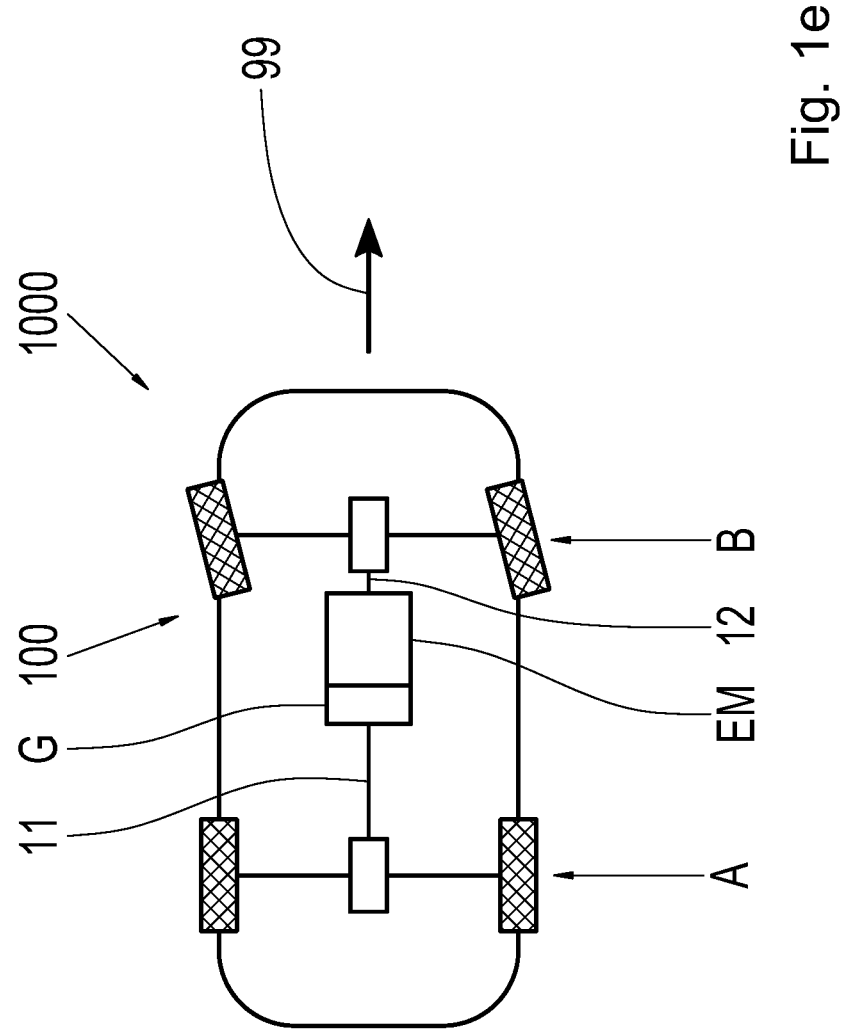

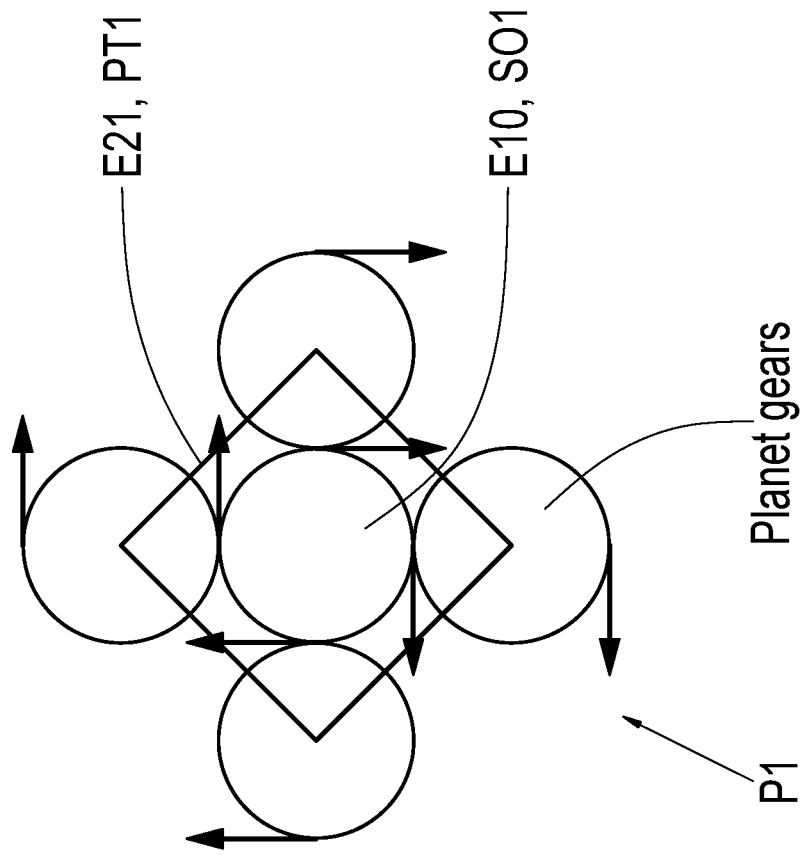
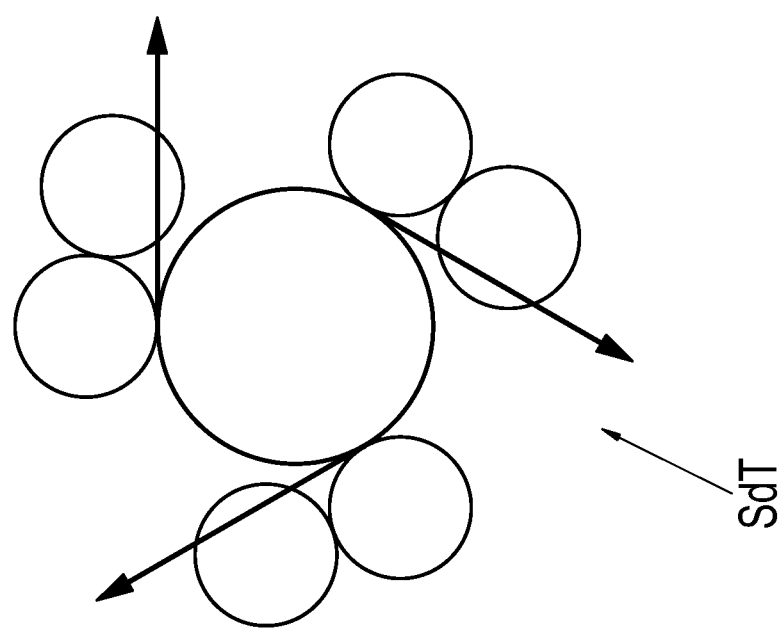
Fig. 15

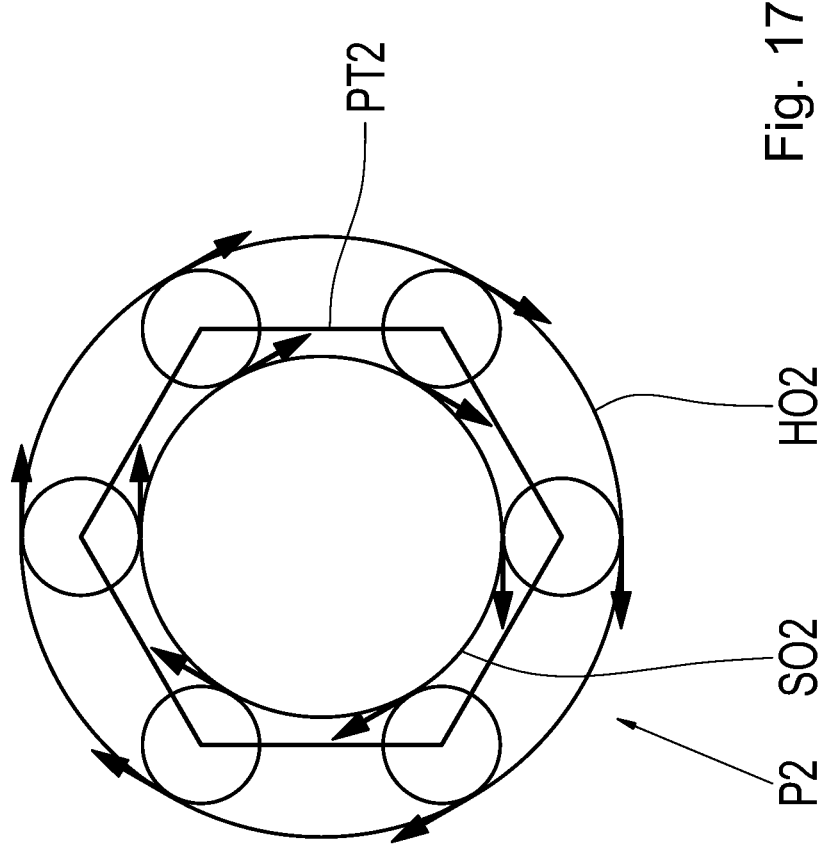
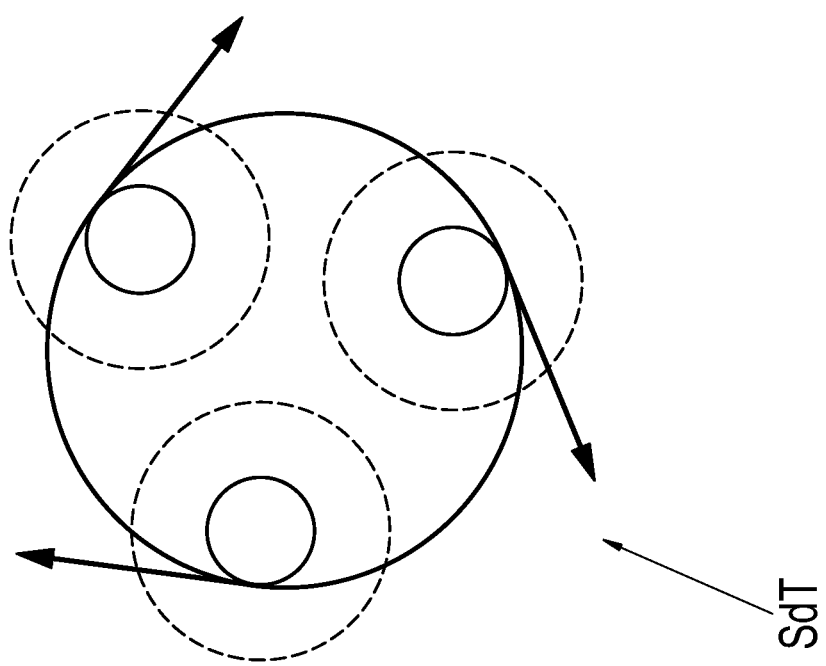
Fig. 17

| Figure | P1 | P2 | Calculating rule |
|---|---|---|---|
| 2, 3 | negative | negative | $i_{02} = \dfrac{1}{i_{01}} - 1$ |
| 8 | negative | negative | $i_{02} = \dfrac{1}{i_{01}} - 1$ |
| 9 | negative | negative | $i_{02} = i_{01} - 1$ |
| 4 | positive | negative | $i_{02} = \dfrac{1}{1 - i_{01}} - 1$ |
| 6 | negative | positive | $i_{02} = 2 - \dfrac{1}{i_{01}}$ |
| 5 | positive | positive | $i_{02} = 2 + \dfrac{1}{i_{01} - 1}$ |

Fig. 19

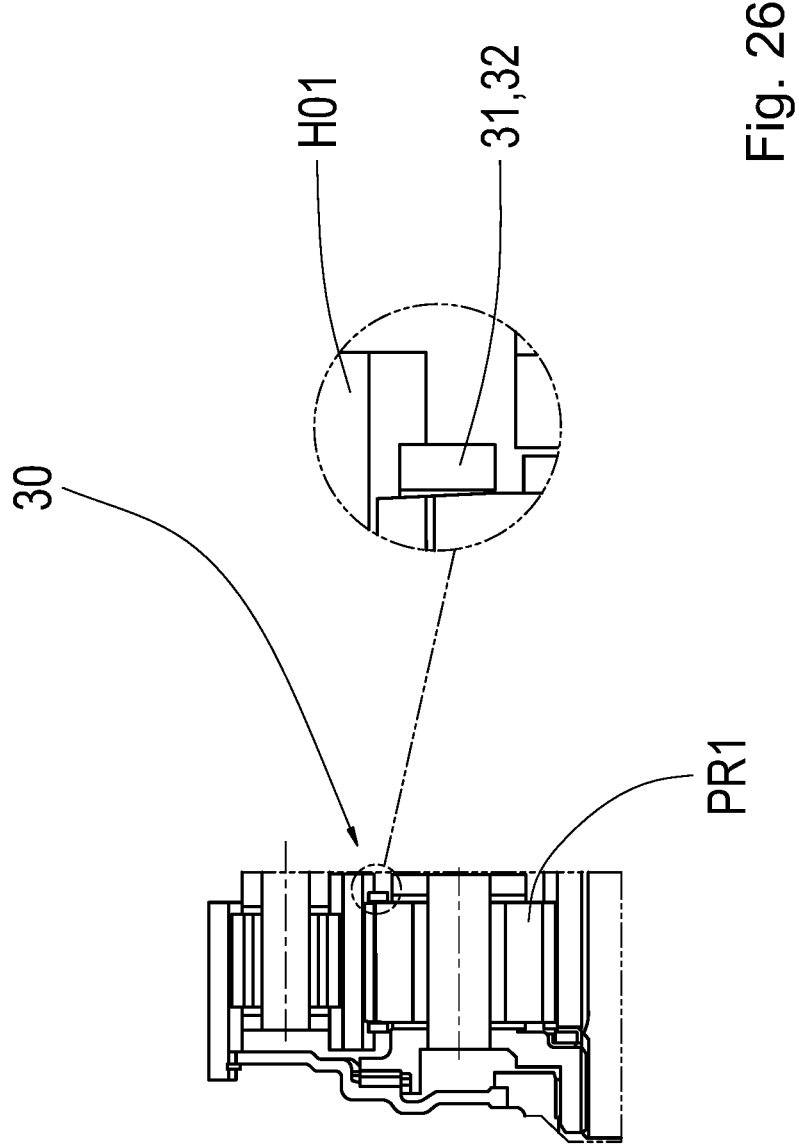

TRANSMISSION, DRIVE TRAIN AND VEHICLE COMPRISING TRANSMISSION

RELATED APPLICATIONS

This application is a filing under 35 U.S.C. § 371 of International Patent Application PCT/EP2020/079808, filed Oct. 22, 2020, and claiming priority to German Patent Application 10 2019 216 507.9, filed Oct. 25, 2019. All applications listed in this paragraph are hereby incorporated by reference in their entireties.

TECHNICAL FIELD

The invention relates to a transmission, in particular for a motor vehicle. The invention also relates to a drive train and a vehicle.

BACKGROUND

Transmissions are known from the prior art, e.g. DE 10 2011 079 975 A1, which provide a torque conversion as a ratio of an output torque to an input torque, and a gear ratio as a ratio of an input rotational rate to an output rotational rate.

An electric vehicle with an integrated differential is known from DE 10 2018 112 880 A1. The electric vehicle drive system contains an electric motor, first and second planetary gear assemblies, including a sun gear, planet carrier and ring gear elements, first and second output shafts, and a housing. The elements of the first planetary gear assembly are connected to the electric motor, the first output shaft, and an element in the second planetary gear assembly. The elements of the second planetary gear assembly are connected to the first planetary gear assembly, the housing, and the second output shaft. The first planetary gear assembly forms a differential reduction device, and the second planetary gear assembly forms a reversal and reduction device. Optional clutches can provide the function of a slippage limiting differential, and distribute torque to one or the other output shaft.

Such a transmission, also referred to as a rolling differential, does not form a combined torque (e.g. at a differential cage), as is otherwise typical in the prior art. The prevention of the formation of a combined torque means that the sum of the individual torques at the two output shafts is not applied to any rotating components, such as the input shaft, output shafts, or elements of the planetary gearsets.

Transmissions with planetary gearsets are also known. The sun and ring gears in these planetary gearsets generate axial forces with helical gearings, which must be braced against outwardly. Roller bearings or thrust collars that are coaxial to the planetary gearsets are used to brace against these axial forces. A thrust collar is a ring attached directly to the gearing with which the gearwheel and pinion are braced against each other. The power flow circuit is consequently much shorter than with a conventional bearing. As a result, gears, shafts, and especially the bearings, can be much lighter, thus minimizing power losses. Furthermore, external axial forces can be transferred from the quickly rotating to the slowly rotating shaft, where they can be deflected over an axial bearing with lower losses. The thrust collar according to the prior art is normally a hardened and polished precision component.

A ring gear is shown in FIG. 2 in DE 103 23 254 A1, which is positioned axially on the planet gears by means of thrust collars. The thrust collars transfer all of the axial forces between the planet gears and ring gear in the helical gearing, and thus close the power flow circuit without conducting the axial forces through a housing. The sun gear is supported on a thrust collar in the same manner as the ring gear.

FIG. 1 in DE 10 2008 041 209 A1 shows two negative planetary gearsets, nested in one another. The central connecting element, which connects the third element, in the form of a ring gear for the one negative planetary gearset, and the first element, in the form of a sun gear for the other negative planetary gearset, to one another, also has further torque input points.

BRIEF DESCRIPTION OF THE DRAWINGS

Advantageous embodiments of the invention that shall be explained below are illustrated in the drawings. Therein:

FIGS. 1a-1e show a schematic illustration of a motor vehicle drive train;

FIGS. 15-18 show a schematic illustration of the functional principle of the invention;

FIG. 19 shows an overview of the standard transmission gear ratios for the individual embodiments;

FIGS. 21-26 show the embodiments shown in FIGS. 20a-20d, in each case in an enlarged detail.

DETAILED DESCRIPTION

Figure 1A:
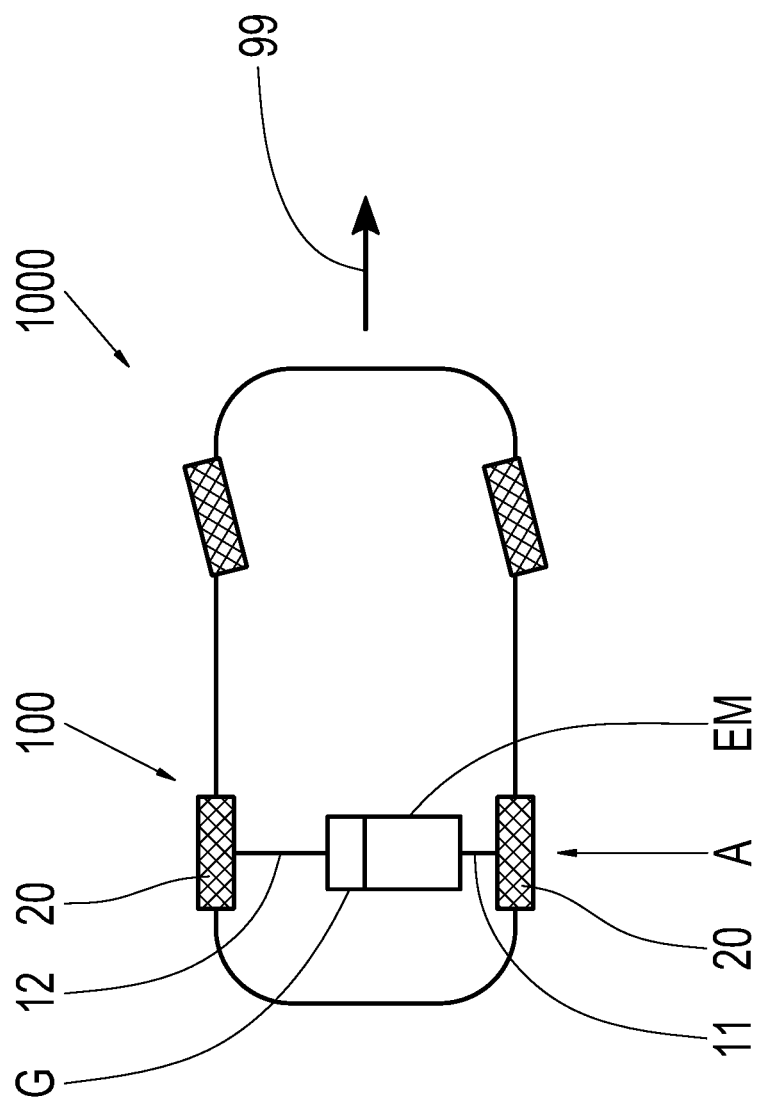

An object of the invention is to create a transmission, in particular in the form of an integrated or rolling differential, which enables an improved supporting of that shaft that connects an element of the one planetary gearset to another element of the other planetary gearset. It is also the object of the invention to provide a drive train that comprises such a transmission, and a motor vehicle.

The invention is based on a transmission that comprises an input shaft, a first output shaft, a second output shaft, a first planetary gearset, and a second planetary gearset connected to the first planetary gearset, wherein the planetary gearsets each comprise numerous elements, wherein a torque applied to the input shaft is converted and distributed in a defined ratio to two output shafts, and the torques are not combined, wherein at least one third element of the first planetary gearset is connected to a first element of the second planetary gearset by means of a shaft for conjoint rotation therewith, and a second element of the second planetary gearset is fixed in place on a non-rotating component.

The transmission is distinctive in that the shaft that connects the third element of the first planetary gearset to the first element of the second planetary gearset is positioned axially on at least one planet gear of one of the two planetary gearsets.

A "shaft" as set forth herein, is understood to be a rotating component in a transmission, via which any associated components of the transmission are connected to one another for conjoint rotation, or via which such a connection is obtained when a corresponding shifting element is actuated. The respective shaft can connect the components axially or radially, or both axially and radially, to one another. The respective shaft can therefore also be an intermediate part, via which a respective component is attached, e.g. radially.

The elements are specifically in the form of a sun gear, a planet carrier, and a ring gear.

"Axial" refers, as set forth herein, to an orientation along a central longitudinal axis, along which the planetary gearsets are coaxial to one another. "Radial" is then to be understood to mean an orientation in the direction of the diameter of a shaft crossing through this central longitudinal axis.

If an element is fixed in place, it is unable to rotate. Non-rotating components of the transmission can preferably be a permanently stationary component, preferably a housing for the transmission, part of such a housing, or a component non-rotatably connected thereto.

The axial positioning of the shaft can take place on both the second element of the first planetary gearset as well as on the second element of the second planetary gearset. It is preferably positioned on the first planetary gearset, however. It can be positioned on either one or more planet gears of the first or second planetary gearset.

By positioning the shaft axially on at least one planet gear, acoustic vibrations are conducted less strongly to the non-rotating component, because vibrational forces are compensated for directly at the stop surface of a stop element, and furthermore, the shaft is not directly coupled to the non-rotating component.

Furthermore, by eliminating a separate bearing for the shaft, there is a savings in costs and installation space, and efficiency losses are reduced. Furthermore, the radial degree of freedom obtained by eliminating the bearing enables a more effective distribution of loads between the individual gear meshings of the planet gears. Furthermore, acoustic excitations are lower.

The transmission can be designed, e.g., such that
the input shaft is connected to a first element of the first planetary gearset for conjoint rotation;
the first output shaft is connected to a second element of the first planetary gearset for conjoint rotation;
wherein a third element of the first planetary gearset is connected to a first element of the second planetary gearset for conjoint rotation;
wherein a second element of the second planetary gearset is fixed in place on a non-rotating component of the transmission;
and the second output shaft is connected to a third element of the second planetary gearset for conjoint rotation.

This results in a transmission that fulfills the functions of converting torque and distributing torque, which were previously fulfilled by two separate assemblies, with a single, integral transmission assembly. The invention is therefore a combined transmission ratio and differential transmission, which can convert torque using a housing bracing, and can also distribute torque to the output shafts. In this context, this can also be referred to as an integrated differential. Furthermore, the shaft that connects the first and second planetary gearsets can be supported in manner that is cost-effective, optimized in terms of structural space, and exhibits low losses.

The description of the torque conversion is to be understood as follows:

The transmission has two output shafts, the combined torque of which in relation to the input torque describes the conversion of the transmission. The gear ratio for the respective output shafts is initially undefined. Defined rotational rates are first generated by coupling the two output shafts, e.g. via the vehicle wheels on a road surface. If both output shafts rotate at the same rate, as is the case when driving along a straight line, for example, the gear ratio can be formed as the ratio of the rotational rates between the input rotational rate and one of the two identical output rotational rates. In all other cases, it is not possible to refer to the gear ratio as a gear ratio of the transmission with the conventional definition.

The two planetary gearsets can be axially adjacent to one another. The first planetary gearset can also be placed radially inside the second planetary gearset. The latter case is also referred to as a nested arrangement of the planetary gearsets.

The teeth of the two elements of the first and second planetary gearsets that are connected to one another, i.e. the third element of the first planetary gearset and the first element of the second planetary gearset, are preferably formed on the same component.

A pitch of the teeth on the third element of the first planetary gearset is preferably identical to that on the first element of the second planetary gearset. The identical pitch enables an axial force freedom of the connecting component or coupling shaft, such that there is no need for a complex axial bearing.

The slope or pitch of a helical gearing is understood to be the axial path measured along an associated rotational axis that is necessary to obtain a 360° encircling of the teeth about the axis along an imaginary extension of a tooth over the actual width of the gearwheel. The term "thread pitch" is used analogously in the case of a threading. A helically toothed gearwheel that has numerous teeth is therefore comparable to a multi-step threading. With spindles, the word "thread pitch" is also commonly used for this.

The input shaft is preferably connected to a drive machine, in particular an electric machine or an internal combustion engine, in order to input a torque to the transmission. In the case of an electric machine, the rotor in the electric machine is preferably connected to the input shaft for conjoint rotation. The rotor is preferably connected to the input shaft via at least one gear ratio step.

The electric machine can be either coaxial to the planetary gearsets or axially parallel thereto. In the first case, the rotor in the electric machine can be connected to the input shaft for conjoint rotation, or it can be coupled thereto via one or more intermediate gear ratio steps, wherein the latter enables a more efficient design of the electric machine, with higher rotational rates and lower torques. The at least one gear ratio step can be in the form of a spur gear step and/or planet gear step.

If instead, the electric machine is axially offset to the planetary gearsets, the coupling is obtained via one or more intermediate gear ratio steps and/or a traction drive. The one or more gear ratio steps can also be formed here individually as either spur gear steps or planetary gear steps. A traction drive can be either a belt or chain drive.

With a coaxial placement of the electric machine, the first output shaft preferably passes through the rotor of the electric machine. As a result, the transmission with an electric machine is particularly compact.

The standard transmission gear ratio for the second planetary gearset is preferably at least approximately calculated from the inverse of the standard transmission gear ratio for the planetary gearset minus 1, i.e.: $i\_02=1/i\_01-1$.

If both planetary gearsets are negative planetary gearsets, this calculation rule results in half the output drive torque being distributed to each of the output shafts, when transmission losses are disregarded. This is advantageous in particular when the invention is used to distribute the torque to two wheels on the same axle.

If another torque distribution is desired, or the if the planetary gearsets have different designs (e.g. FIGS. 4 to 9), a calculating rule can be defined in a similar manner (FIG. 19). The term "at least approximately" is used because the asymmetrical transmission losses under real conditions when in operation may mean that a slight deviation from the calculating rule is advantageous with regard to obtaining identical output torques at both shafts. This formulation is also used because it may not be possible to precisely maintain the calculating rule when using whole number values for the numbers of teeth and beneficial tooth number combinations, e.g. with regard to acoustic requirements.

The number of planets in the second planetary gearset is preferably greater than the number of planets in the first planetary gearset. Despite use of the above calculating rule, a large transmission gear ratio can be obtained by means of this configuration, which in turn results in a particularly compact and cost-effective electric machine.

The second planetary gearset preferably has five, six, seven, or eight planets. The first planetary gearset preferably has three or four planets.

Another positive effect of the large, or larger, number of planets on the second planetary gearset is that the sun gear and/or ring gear in the second planetary gearset can be very thin, and therefore light, cost-effective, and take up less structural space.

The large, or larger, number of planets also makes it possible to conduct the gear forces to the sun gear and/or ring gear more evenly. This results in a lower elastic deformation of the sun gear or ring gear.

Furthermore, the shaft connecting the first and second planetary gearsets can be better supported by a high number of planets on the second planetary gearset. This is possible because the planet gears in the second planetary gearset are fixed in place in the housing, and the shaft in question is centered therein. Planet gears that are fixed in place in the housing can only rotate about their own rotational axis, i.e. they cannot circulate.

As a matter of course, the number of planet gears in the second planetary gearset can also be greater than that in the first planetary gearset when the calculating rule is not used.

The drive machine is preferably installed transverse to the direction of travel. The two output shafts are preferably connected to wheels on the vehicle for conjoint rotation.

The two output shafts preferably distribute the input torque to different axles in the vehicle. The makes it possible to obtain a longitudinal distribution transmission (also referred to as a longitudinal distributer), i.e. a transmission that distributes the input torque to numerous axles, for example, in particular a front axle and a rear axle in a vehicle.

The torque distribution to the output shafts does not need to be uniform. In particular with the embodiment as a longitudinal distribution transmission, the distribution to the two axles does not need to be uniform. By way of example, the distribution of the torque from the input shaft can be such that 60% is conducted to the rear axle, and 40% is conducted to the front axle.

The two planetary gearsets can be in the form of either a negative or positive planetary gearset. A combination of negative and positive planetary gearsets is also possible.

A negative planetary gearset is comprised in the manner known in principle to the person skilled in the art of a sun gear, planet carrier, and ring gear, wherein the planet carrier guides at least one, preferably numerous rotatably supported planet gears, each of which meshes with both the sun gear and the encompassing ring gear.

A positive planetary gearset also comprises a sun gear, ring gear, and planet carrier, wherein the latter guides at least one pair of planet gears, one of which meshes with the internal sun gear, while the other planet gear meshes with the encompassing ring gear, and the planet gears also mesh with one another.

Where it is possible to connect the individual elements, a negative planetary gearset can be replaced with a positive planetary gearset, wherein, unlike in the embodiment as a negative planetary gearset, the ring gear and the planet carrier connection are exchanged, and the value of the standard transmission gear ratio is increased by one. Conversely, a positive planetary gearset can also be replaced by a negative planetary gearset, as long as the connection of the elements in the transmission allows for this. In this case, in comparison with the positive planetary gearset, the ring gear and planet carrier connections are likewise exchanged, and a standard transmission gear ratio is reduced by one, and the sign is reversed from plus to minus. In the framework of the invention, the two planetary gearsets are each preferably in the form of negative planetary gearsets.

Both planetary gearsets are preferably designed as negative planetary gearsets. These are efficient, and can be placed axially adjacently to one another, and nested radially.

With a combination of negative and positive planetary gearsets in a nested arrangement, the radially inner planetary gearset is preferably a negative planetary gearset, and the radially outer planetary gearset is preferably a positive planetary gearset. This makes a nested arrangement easy to obtain. Furthermore, the fixed ring gear has the advantage in this context that the poorer efficiency (normally) resulting from the positive planetary gearset only affects one output shaft.

In the framework of the invention, the transmission can also have an upstream step-up gearing or a multi-gear transmission, preferably a 2-gear transmission. This step-up gearing or multi-gear transmission can then also be part of the transmission, and is used to obtain an additional gear ratio in that, e.g., the rotational rate of the drive machine is translated by the transmission ratio, and the input shaft is driven with this translated rotational rate. The multi-gear transmission or step-up gearing can be in the form of a planetary transmission, in particular.

The elements of the transmission can preferably be combined as follows:

a) a transmission with two negative planetary gearsets, wherein
  the first element of the first planetary gearset is a sun gear,
  the second element of the first planetary gearset is a planet carrier, and the third element of the first planetary gearset is a ring gear,
and wherein
the first element of the second planetary gearset is a sun gear,
the second element of the second planetary gearset is a planet carrier, and
the third element of the second planetary gearset is a ring gear.

This transmission can be referred to as a first concept with two negative planetary gearsets.

b) a transmission with two negative planetary gearsets, wherein
the first element of the first planetary gearset is a sun gear,
the second element of the first planetary gearset is a ring gear, and
the third element of the first planetary gearset is a planet carrier,
and wherein
the first element of the second planetary gearset is a ring gear,
the second element of the second planetary gearset is a planet carrier, and
the third element of the second planetary gearset is a sun gear.

This transmission can be referred to as a second concept with two negative planetary gearsets.

c) a transmission with two negative planetary gearsets, wherein
the first element of the first planetary gearset is a ring gear,
the second element of the first planetary gearset is a planet carrier, and
the third element of the first planetary gearset is a sun gear,
and wherein
the first element of the second planetary gearset is a sun gear,
the second element of the second planetary gearset is a planet carrier, and
the third element of the second planetary gearset is a ring gear.

This transmission can be referred to as a fifth concept with two negative planetary gearsets.

d) a transmission with a positive and a negative planetary gearset, wherein the second planetary gearset is the negative planetary gearset, wherein
the first element of the first planetary gearset is a sun gear,
the second element of the first planetary gearset is a ring gear, and
the third element of the first planetary gearset is a planet carrier,
and wherein
the first element of the second planetary gearset is a sun gear,
the second element of the second planetary gearset is a planet carrier, and
the third element of the second planetary gearset is a ring gear.

This transmission is basically the first concept, with a positive planetary gearset.

e) a transmission with a positive and a negative planetary gearset, wherein the first planetary gearset is the negative planetary gearset, wherein
the first element of the first planetary gearset is a sun gear,
the second element of the first planetary gearset is a planet carrier, and
the third element of the first planetary gearset is a ring gear,
and wherein
the first element of the second planetary gearset is a sun gear,
the second element of the second planetary gearset (P2) is a ring gear, and
the third element of the second planetary gearset is a planet carrier.

This transmission is basically the first concept, with a positive planetary gearset.

f) a transmission with two positive planetary gearsets, wherein
the first element of the first planetary gearset is a sun gear,
the second element of the first planetary gearset is a ring gear, and
the third element of the first planetary gearset is a planet carrier,
and wherein
the first element of the second planetary gearset is a sun gear,
the second element of the second planetary gearset is a ring gear, and
the third element of the second planetary gearset is a planet carrier.

This transmission is basically the first concept, with two positive planetary gearsets.

The pitch of the gearing on the third element in the first planetary gearset and the pitch of the gearing on the first element in the second planetary gearset are preferably at least similar, preferably the same, and have the same sign. As a result, the connecting shaft for the planetary gearsets is axially balanced. Furthermore, the axial force from the gearing on the first element in the first planetary gearset and the axial force from the gearing on the third element in the second planetary gearset are consequently the same.

The shaft is preferably axially positioned exclusively on planet gears of one of the two planetary gearsets. The positioning can take place on either one or more planet gears of the first or second planetary gearsets.

The axial positioning of the shaft is preferably obtained by means of at least one thrust element, preferably by means of a thrust collar, a thrust washer, or a snap ring. In other words, the axial support is obtained through thrust applied to one or more planet gears, preferably the first and/or second planetary gearset.

The radial support of the shaft is preferably obtained exclusively by means of the planet gears. By centering it in the planet gear or in the planet gears of the outer planetary gearset, the need for a conventional bearing for the shaft—and therefore also the third element of the first planetary gearset and the first element of the second planetary gearset—is eliminated.

There is preferably no further connection to the shaft, such that a torque input from the first number of planet gears in the first planetary gearset to the third element of the first planetary gearset is also conducted via the first element of the second planetary gearset to the second number of planet gears in the second planetary gearset in every operating situation.

The thrust element can be placed on either the third element of the first planetary gearset, the first element of the second planetary gearset, at least one planet gear of the first planetary gearset, or on at least planet gear of the second planetary gearset.

The thrust element can be placed in particular on an inner gearing of a third element of one of the two planetary gearsets. This has the advantage that without a special centrifugal force safeguard, snap rings or safety rings may be used. In other words, the centrifugal forces are not critical in this arrangement. Furthermore, in the preferred embodiment of the nested planetary gearset assembly (i.e. in an assembly with a radially inner planetary gearset and a radially outer planetary gearset), the radially inner planet gear diameters are the greater of the two, such that a greater contact surface can be obtained. Furthermore, despite a radial spacing between the contact surfaces and pitch point, a lower difference in speed is obtained at the contact surface.

The contact surface is that surface on the thrust element via which the two corresponding gearwheels bear against one another when an axial force is applied. Because the paths are normally both conical with an overlapping camber, a contact point is obtained at the point where they come in contact (with an ideal stiffness). The individual slipping speeds in the contact surface (simplified as the sliding speed at the contact point) are decisive for the losses.

The pitch point for two gearwheels in a pair of gearwheels is the point at which the speed vectors of the two gearwheels are identical. From a spatial perspective, this is a straight line.

The thrust element can also be placed on an outer gearing of a first element or a planet gear of one of the two planetary gearsets.

The thrust element preferably has a gearing that is designed such that it can be slid over or through an associated or corresponding gearing, i.e. the aforementioned outer or inner gearing, where the thrust element is located.

In an operating situation, the thrust element is preferably turned in relation to corresponding teeth to a defined extent with respect to an installation position in a groove, preferably one half of the width of a tooth.

A turning back of the thrust element is preferably prevented by a component formed in a gap in the thrust element. The component can be a locking washer, for example, placed in the gap.

By turning the ring in the groove, this forms an extremely robust solution. The solution is particularly advantageous when relatively high axial forces are to be transferred via the thrust element. This may be the case, for example, when it is not possible with transmissions subjected to very high loads to design the gearing such that the axial forces are counterbalanced, wherein counterbalanced axial forces are understood to mean that the forces of the axial gearing force between the third element in the first planetary gearset and the first element of the second gearset are counterbalanced in the shaft 3, such that when the axial forces are counterbalanced, it is not necessary to brace against axial forces from the gearing of the shaft 3 in a housing or another shaft. This may also be the case if a further torque is applied to the shaft, e.g. by a torque-vectoring unit attached thereto.

The thrust element is preferably secured in place by a locking washer or snap ring.

The thrust element is preferably cylindrical at the side located on the associated gearing.

The thrust element is preferably secured against turning in the associated gearing.

The thrust element preferably has a conical and/or cambered thrust surface on at least one side, preferably both sides. As a result, the thrust element, e.g. in the form of a ring, can be placed in position in either direction.

The thrust element preferably has a flat thrust surface on at least one side, preferably both sides.

The thrust element is preferably a snap ring.

The gearwheel formed on the thrust element is preferably conical and/or cambered on the thrust surface.

The transmission is part of a motor vehicle drive train for a hybrid or electric vehicle in particular, and is then located between a drive machine in the form of an internal combustion engine or an electric machine in the motor vehicle and the subsequent components of the drive train in the direction of the force flow to the drive wheels of the motor vehicle. The input shaft of the transmission is then preferably coupled with a crankshaft of the internal combustion engine or the rotor shaft of the electric machine. The transmission can also be part of a drive train for a conventional motor vehicle, i.e. a vehicle that is powered by only an internal combustion engine.

That two components of the transmission are "connected" or "coupled," or "connected to one another" for conjoint rotation means, as set forth in the invention, that these components are coupled in a fixed manner, such that they cannot rotate independently from one another. In this regard, there is no shifting element between these components, which may be elements in the planetary gearsets and/or shafts and/or a non-rotating component of the transmission, and instead, the components in question are permanently coupled to one another. A rotationally flexible connection between two components for conjoint rotation is also understood to be a conjoint rotational connection. In particular, a connection for conjoint rotation can also contain joints, e.g. for enabling a steering movement or spring deflection of a wheel.

According to another aspect of the invention, a drive train for a vehicle is provided, which comprises a transmission that has the features described above. The advantages of the transmission also apply to a drive train with such a transmission.

According to another aspect of the invention, a vehicle is provided, which has a drive train comprising a transmission that has the features described above. The advantages of the transmission also apply to a vehicle that has such a transmission.

On the whole, a transmission and a vehicle comprising such a transmission can be provided by the invention, which has an integral construction, i.e. a torque conversion and torque distribution as well as a compact and axially short construction (in particular with a nested assembly). Furthermore, the transmission is distinguished by high efficiency and low costs as a result of reduced complexity. There are significantly lower gearing forces. Furthermore, the problems caused by grinding the gears are reduced. Furthermore, it also exhibits an extremely low locking value.

The invention is not limited to the combination of features described in the independent claims or the claims dependent thereon. There are other possibilities for combining individual features that can be derived from the claims, the following description of preferred embodiments of the invention, or directly from the drawings, with one another. References in the claims to the drawings through the use of reference symbols are not intended to limit the scope of protection of the claims.

FIGS. 1a to 1e each show a schematic illustration of a transmission G for a motor vehicle drive train 100 in a vehicle 1000 in the form of a passenger automobile.

The drive train 100 according to FIG. 1a has an electric drive that powers the rear axle A of the vehicle 1000. The drive train comprises a transmission G that distributes the drive torque from the electric machine EM to two output shafts 11 and 12. The transmission G and the electric machine are located in the same housing. The forward direction of travel is indicated by the arrow 99. As can also be seen in FIG. 1*a*, the transmission G and the electric machine EM are oriented transverse to the vehicle's direction of travel.

Figure 1B:
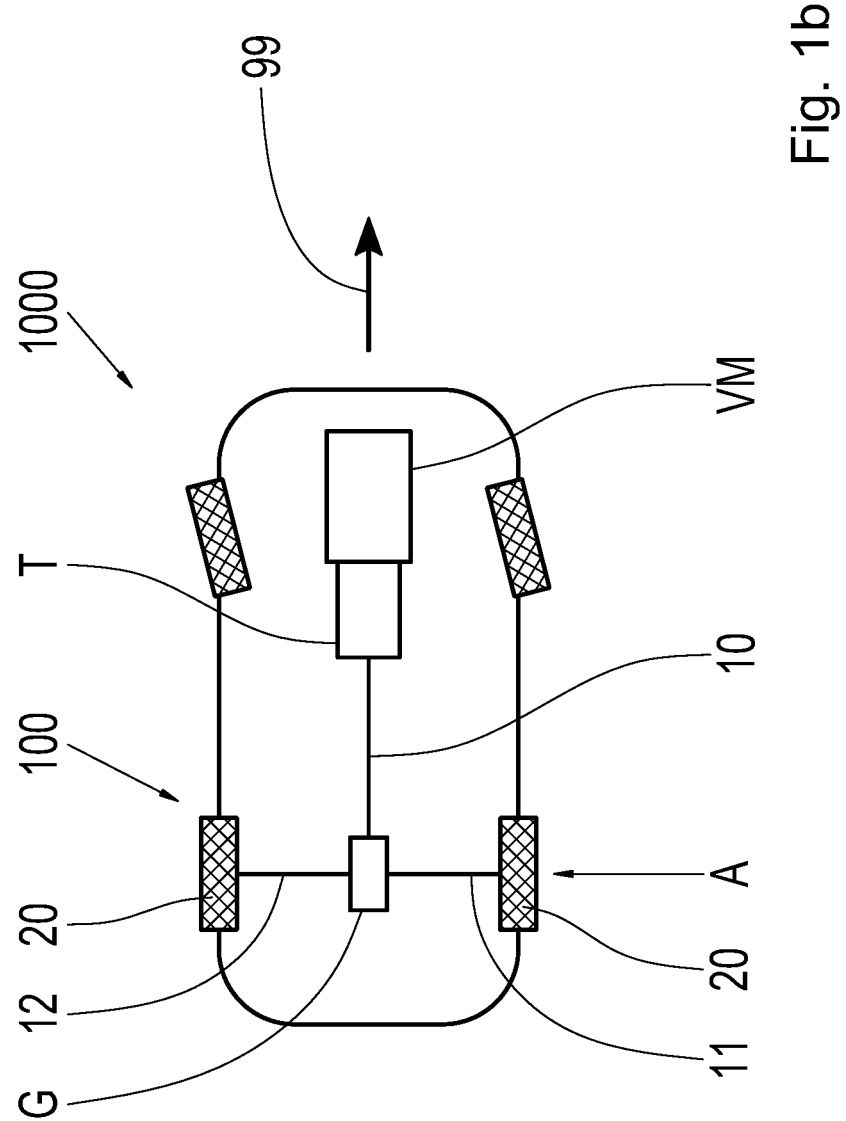

The drive train 100 according to FIG. 1*b* has an internal combustion engine drive that powers the rear axle A of the vehicle 1000. The drive train comprises a transmission G, which distributes the drive torque from the internal combustion engine VM to two output shafts 11 and 12, wherein there is another transmission, e.g. an automatic transmission for the vehicle, located between the transmission G and the internal combustion engine VM. The forward direction of travel is indicated by the arrow 99. As can also be seen in FIG. 1*b*, the transmission G and the internal combustion engine VM are oriented longitudinally in relation to the vehicle's direction of travel.

Figure 1C:
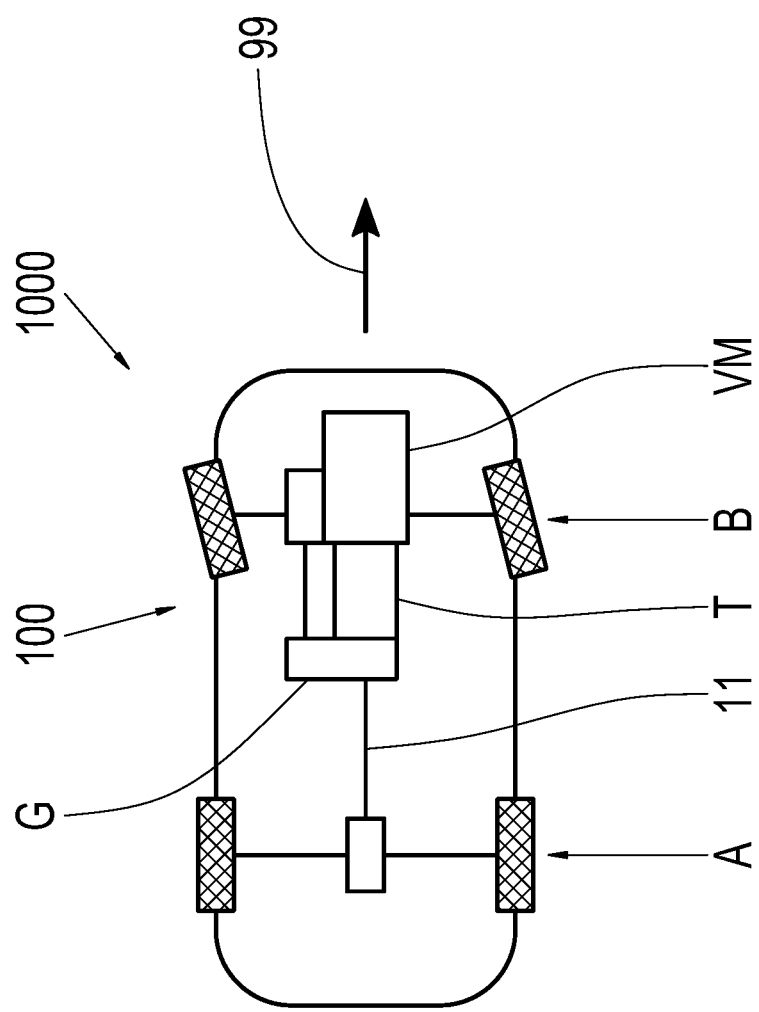

The drive train 100 according to FIG. 1*c* has an internal combustion engine drive that powers the rear axle A and the front axle B of the vehicle 1000. The drive train comprises a transmission G, which distributes the drive torque from the internal combustion engine VM to the axles A and B, wherein there is another transmission, e.g. an automatic transmission, for the vehicle, located between the transmission G and the internal combustion engine VM. The transmission G can then be connected to an axle differential for the rear axle A via an output shaft 11 and to an axle differential for the front axle B via an output shaft 12. The forward direction of travel is indicated by the arrow 99. As can also be seen in FIG. 1*c*, the transmission G and the internal combustion engine VM are oriented longitudinally in relation to the vehicle's direction of travel.

Figure 1D:
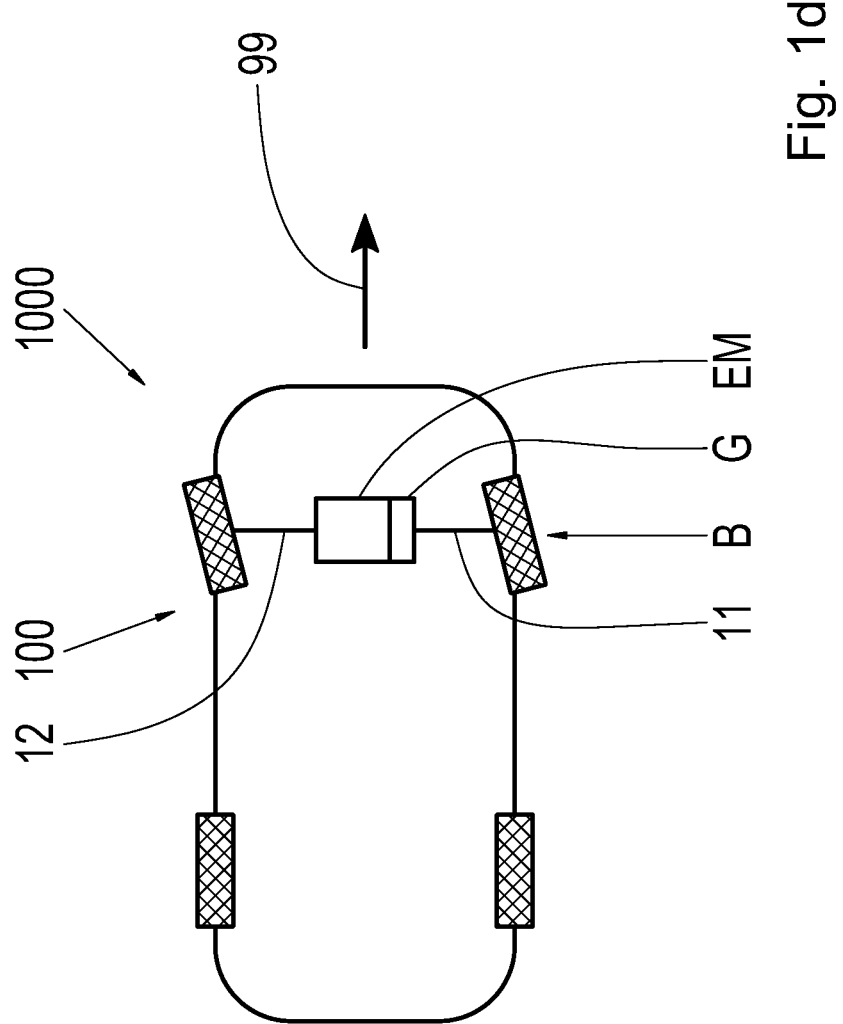

The drive train 100 according to FIG. 1*d* has an electric drive that powers the front axle B of the vehicle 1000, i.e. an electric front-transverse drive. The drive train comprises a transmission G, which distributes the drive torque from the electric machine EM to two output shafts 11 and 12. The transmission G and the electric machine are located in the same housing. The forward direction of travel is indicated by the arrow 99. As can also be seen in FIG. 1*d*, the transmission G and the electric machine EM are transverse to the vehicle's direction of travel.

The drive train 100 according to FIG. 1*e* has an electric all-wheel drive that powers both the rear axle A and the front axle B of the vehicle 1000. This is a transmission designed as a longitudinal distributer. The drive train comprises a transmission G, which distributes the drive torque from the electric machine EM to two output shafts 11 and 12. The output shaft 11 transfers the torque to the front axle B, while the output shaft 12 transfers the torque to the rear axle A. The respective torques are then input to the respective axle differentials. The transmission G and the electric machine are located in the same housing. The forward direction of travel is indicated by the arrow 99. As can also be seen in FIG. 1*e*, the transmission G and the electric machine EM are oriented transverse to the vehicle's direction of travel.

Figure 2:
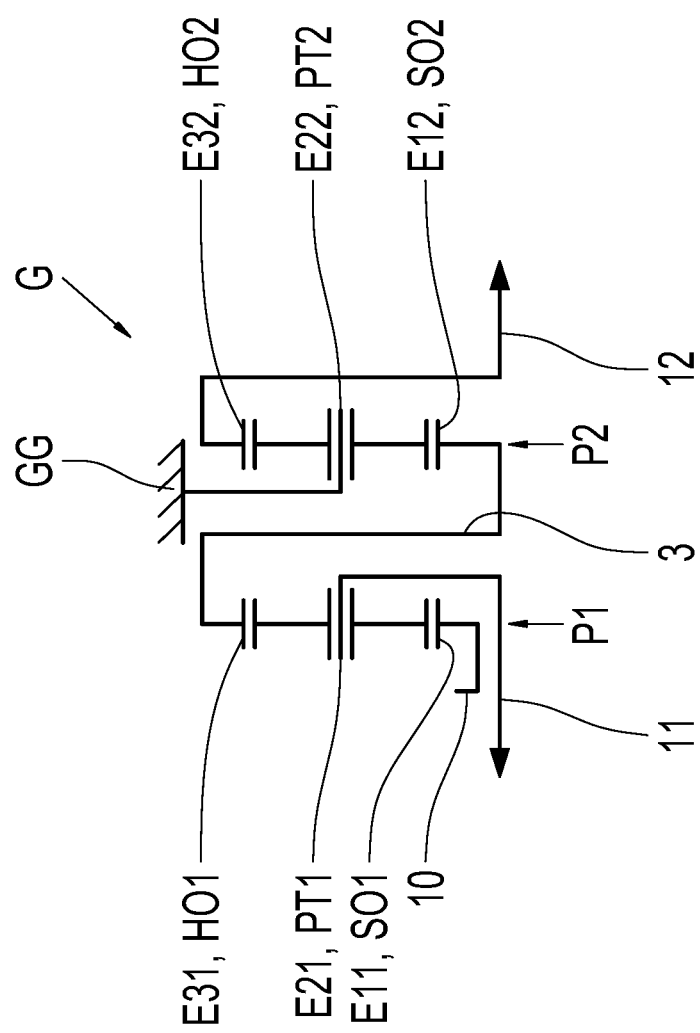
FIGS. 2-5 each show a schematic illustration of a transmission as it can be used in the motor vehicle drive train shown in FIG. 1, in each case in a preferred embodiment.

FIG. 2 shows a transmission G in a first preferred embodiment. The transmission G comprises an input shaft 10, a first output shaft 11, a second output shaft 12, a first planetary gearset P1 and a second planetary gearset P2, connected to the first planetary gearset P1. The planetary gearsets P1 and P2 are each designed as negative planetary gearsets in the present case. The planetary gearsets P1, P2 each comprise numerous elements E11, E21, E31, E12, E22, E32, wherein the first element E11 is a sun gear SO1, the second element E21 is a planet carrier PT1, and the third element E31 of the first planetary gearset P1 is a ring gear HO1. In the second planetary gearset P2, the first element E12 is a sun gear SO2, the second element E22 is a planet carrier PT2, and the third element E32 is a ring gear HO2. The planet gear carriers PT1, PT2 each support numerous planetary gears, which are illustrated but not given reference symbols. The planet gears mesh with the respective, radially inner sun gear and with the respective encompassing ring gear. The input shaft 10, the first output shaft 11, and the second output shaft 12 are coaxial to one another. The two planetary gearsets P1, P2 are also coaxial to one another.

The input shaft 10 in the present case is connected to the first element E11 for conjoint rotation. The first output shaft 11 is connected to the second element E21 of the first planetary gearset for conjoint rotation. The second output shaft 12 is connected to the third element E32 of the second planetary gearset for conjoint rotation. The third element E31 of the first planetary gearset P1 is connected to the first element E12 of the second planetary gearset P2 for conjoint rotation, while the second element E22 of the second planetary gearset P2 is attached permanently to a non-rotation component GG. The non-rotating component GG is a transmission housing for the transmission G.

The third element E31, i.e. the ring gear HO1 of the first planetary gearset P12 and the first element E12, i.e. the sun gear SO2 of the second planetary gearset, form a common component, which in the present case is a shaft 3.

The feature according to the invention, according to which the shaft 3 is positioned axially on at least one planet gear PR1, PR2 of one of the two planetary gearsets P1, P2, is present, but not illustrated. The axial support of the shaft 3 according to the invention shall be explained in greater detail below in reference to FIGS. 20 (*a-d*) to 26.

As can be seen in FIG. 2, the input shaft 10, first output shaft 11, and second output shaft 12, are coaxial to one another. The two planetary gearsets P1, P2 are also coaxial to one another. The two planetary gearsets P1, P2 are also axially spaced apart in this embodiment.

The input shaft 10 can be connected to a drive machine, and thus input an input torque to the transmission G. This means that the input shaft and output shafts all turn in the same direction. By connecting the two planetary gearsets P1, P2 to one another, and bracing the second element E22 against the housing GG, the input torque can be distributed to the two output shafts 11, 12. In this case, the transmission assumes not only the function of a step-up gearing, but also that of a differential transmission. This means that the input torque is not only translated by a transmission ratio, but is also distributed to different output shafts. The direction of rotation is not reversed in this embodiment.

Figure 3:
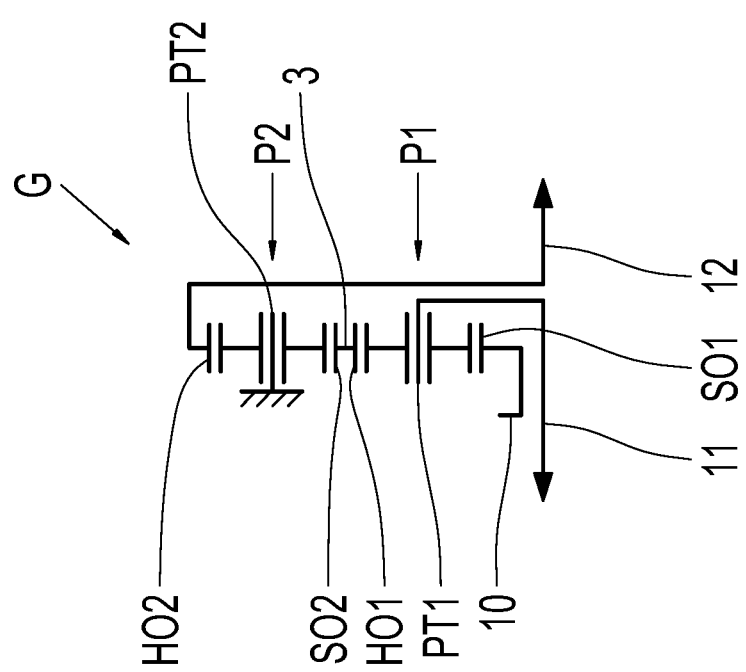

FIG. 3 shows another preferred embodiment of the transmission G. Unlike the embodiment shown in FIG. 2, the embodiment in FIG. 3 has a radially nested arrangement of the two planetary gearsets P1, P2. While the embodiment according to FIG. 2 proposes a extremely compact radial structural solution, the embodiment according to FIG. 3 enables an extremely compact axial structural transmission G. The first planetary gearset P1 forms the radially inner planetary gearset in this case. The second planetary gearset P2 forms the radially outer planetary gearset. The first planetary gearset P1 is therefore radially inside the second planetary gearset P2. The connection if the first ring gear HO1 in the first planetary gearset P1 to the sun gear SO2 in the second planetary gearset in this embodiment also forms a single component, which in the present case is also a shaft 3. There is also no reversal of the direction of rotation in this embodiment.

Figure 4:
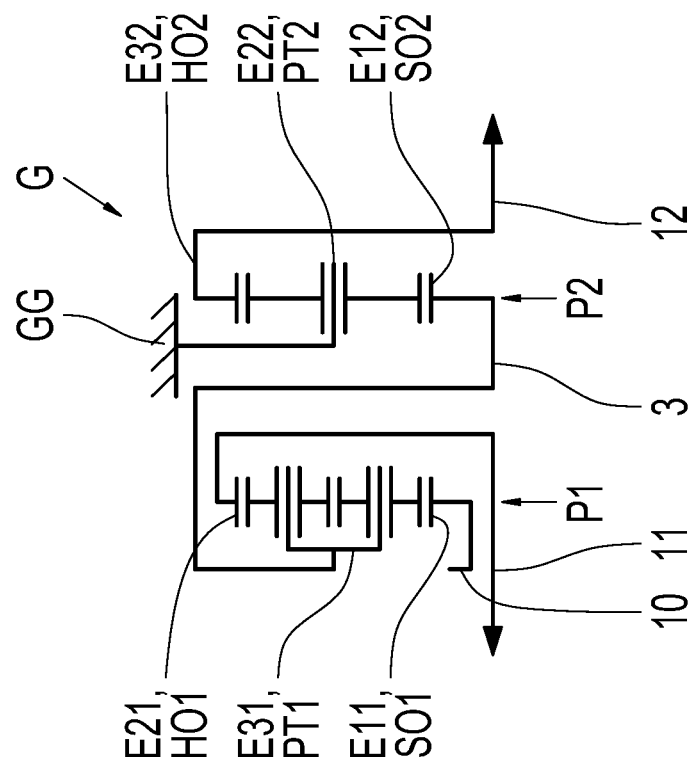

FIG. 4 shows a transmission G in another preferred embodiment. The difference to FIG. 2 is that the first planetary gearset P1 is now designed as a positive planetary gearset. This means that the third element E31 in the first planetary gearset is designed as a planet gear carrier, which is connected to the first element E12 of the second planetary gearset, i.e. the sun gear SO2, for conjoint rotation. The second element E21 is then designed as a ring gear HO1, and connected to the first output shaft 11 for conjoint rotation. The third element E31 of the first planetary gearset and the first element E12 of the second planetary gearset are then formed on the same component, which is a shaft 3 in the present case. For all other details, reference is made to the explanations regarding FIG. 2.

Figure 5:
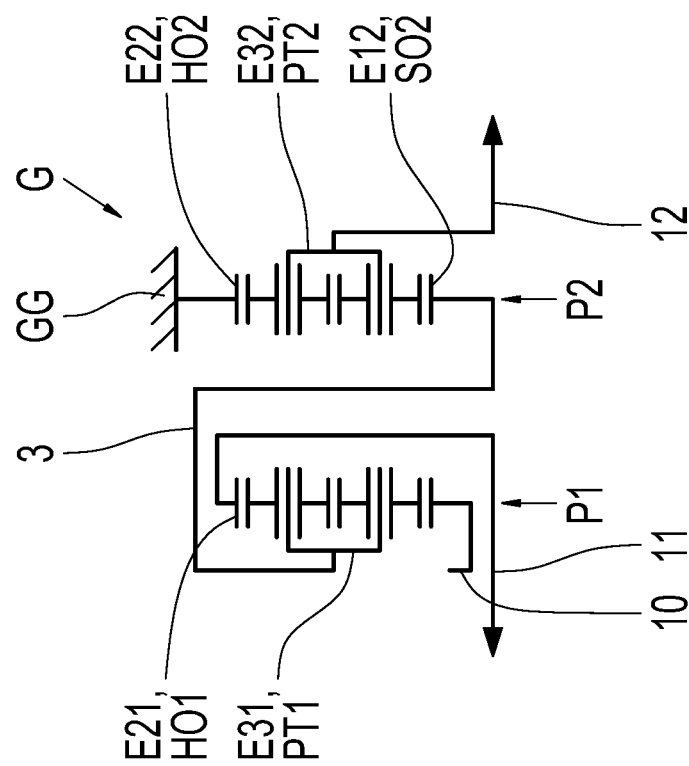

FIG. 5 shows another preferred embodiment of the transmission G. Unlike the embodiment in FIG. 2, both planetary gearsets P1, P2 now form positive planetary gearsets. The second element E21 is therefore in the form of a ring gear HO1, and connected to the first output shaft 11 for conjoint rotation. The third element E31 is then in the form of a planet carrier PT1, and connected to the first element E12, i.e. the sun gear SO2 of the second planetary gearset P2, for conjoint rotation. The second element E22 in the second planetary gearset P2 is then in the form of the ring gear HO2, and fixed in place on the non-rotating component GG. The third element E32 of the second planetary gearset P2 is in the form of a planet carrier PT2, and connected to the second output shaft 12 for conjoint rotation.

The planet carrier and ring gear connections are therefore exchanged in both planetary gearsets P1, P2. For all other details, reference is made to the explanations regarding FIG. 2.

Figure 6:
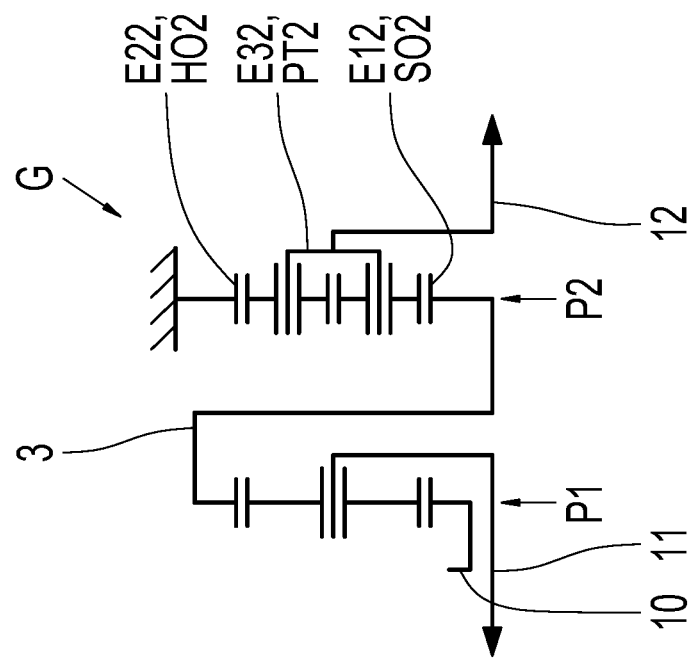
FIG. 6 shows a schematic illustration of a transmission as it can be used in the motor vehicle drive train shown in FIG. 1, in another preferred embodiment.

FIG. 6 shows a transmission in another preferred embodiment. Unlike the embodiment in FIG. 2, the second planetary gearset P2 is then in the form of a positive planetary gearset, while the first planetary gearset P1 remains unchanged. The ring gear HO2 of the second planetary gearset P2 is therefore fixed in place on the housing GG. Furthermore, the planet carrier PT2 is connected to the second output shaft 12 for conjoint rotation. The planet carrier and ring gear connections in the second planetary gearset are therefore exchanged. For all other details, reference is made to the explanations regarding FIG. 2.

Figure 7:
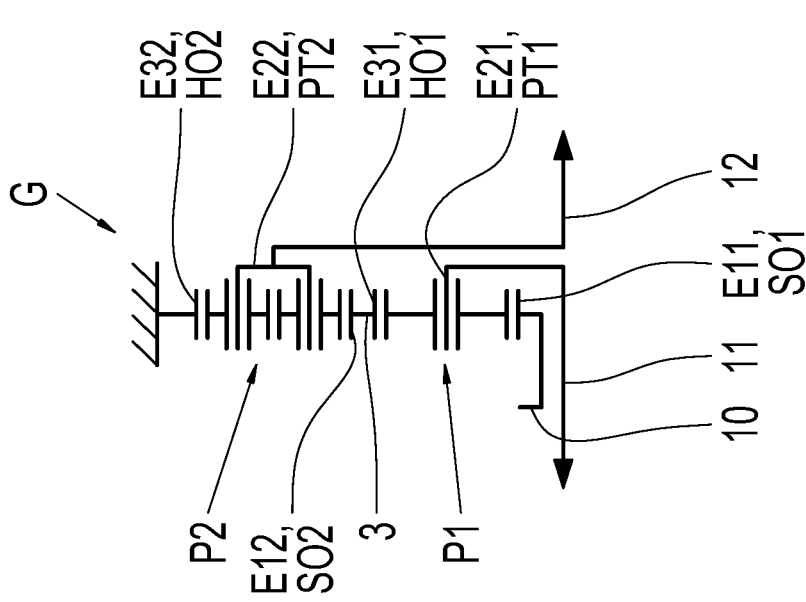
FIGS. 7-9 each show a schematic illustration of a transmission as it can be used in the motor vehicle drive train shown in FIG. 1, in each case in another preferred embodiment.

FIG. 7 shows another preferred embodiment of the transmission G. Unlike the embodiment in FIG. 6, the embodiment in FIG. 7 has radially nested planetary gearsets P1, P2. The radially inner planetary gearset is the first planetary gearset P1. The radially outer planetary gearset is the second planetary gearset. For all other details, reference is made to the explanations regarding FIGS. 6 and 2.

Figure 8:
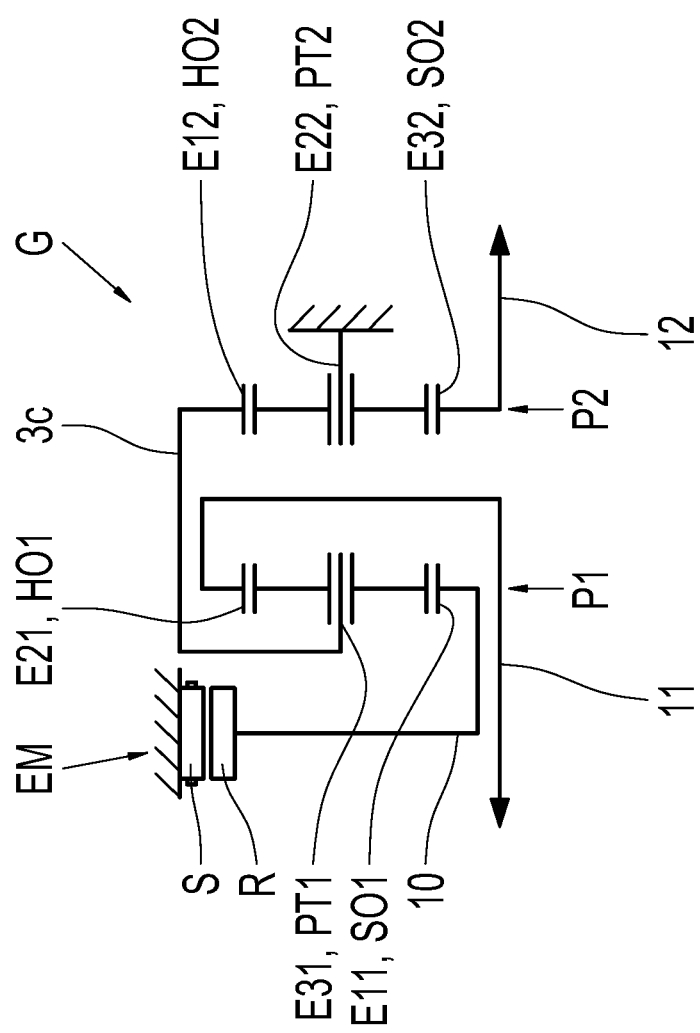

FIG. 8 shows the transmission G in another preferred embodiment. This embodiment exhibits the following differences to the embodiment in FIG. 2. First, there is a drive machine in the form of an electric machine EM. The electric machine EM comprises a stator S and a rotor R in a housing. The rotor R for the electric machine EM is connected to the first element E11, i.e. the sun gear SO1 in the first planetary gearset, for conjoint rotation. A further difference is that the second element E21 in the first planetary gearset is in the form of a ring gear HO1, and connected to the first output shaft 11 for conjoint rotation. Furthermore, the third element E31 in the first planetary gearset P1 is in the form of a planet carrier PT1, and is connected to the first element E12 of the second planetary gearset P2, which is in the form of a ring gear HO2 in the present case, for conjoint rotation. The second element E22 of the second planetary gearset is still in the form of a planet carrier PT2, and fixed in place on the housing GG. The third element E32 is then in the form of a sun gear SO2, and connected to the second output shaft for conjoint rotation. In this preferred embodiment, the input rotation is reversed. It is not possible to nest the planetary gearsets P1, P2 in this embodiment.

In other words, the torque is still input via the sun gear SO1 in the first planetary gearset P1, while the output is obtained via the ring gear HO1. Unlike in FIG. 2, the planet carrier in the first planetary gearset P1 is then connected to the ring gear HO2 of the second planetary gearset for conjoint rotation. Unlike the embodiment in FIG. 2, the output of the second planetary gearset then takes place via the sun gear SO2.

Figure 9:
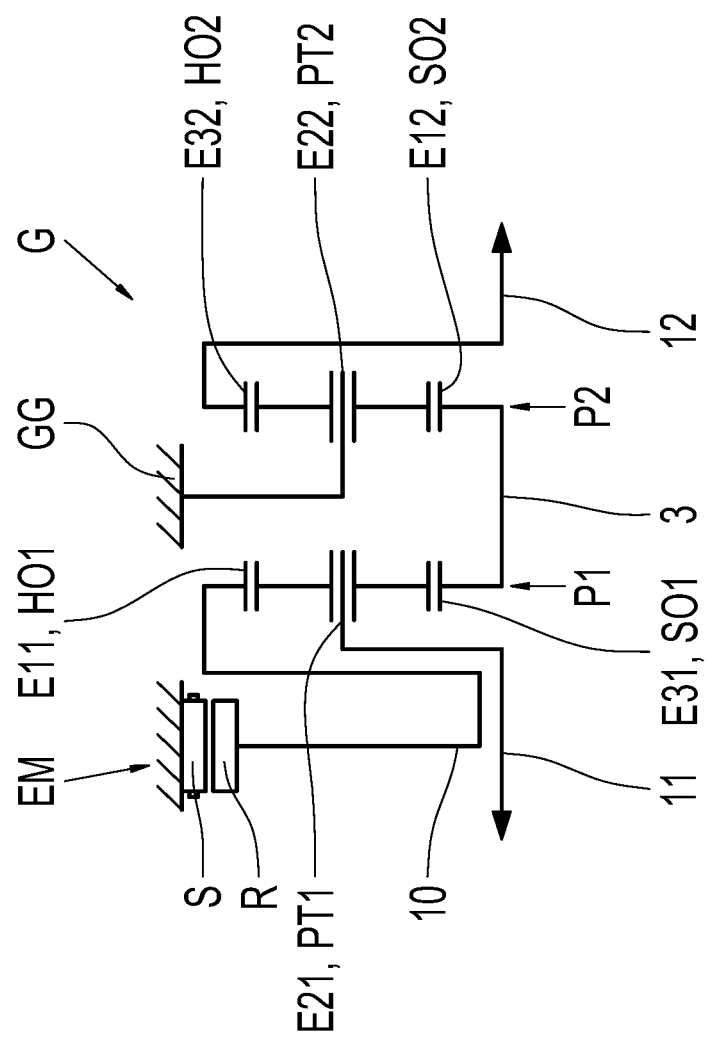

FIG. 9 shows another preferred embodiment of the transmission G. The embodiment exhibits the following differences to the embodiment in FIG. 2. First, there is a drive machine in the form of an electric machine EM, which has a stator S and a rotor R in a housing. The rotor R is connected to the input shaft 10 for conjoint rotation, which in turn is connected to the first element E11, a ring gear HO1 in the present case, in the first planetary gearset P1. The first output shaft 11 is connected to the second element E21, in the form of a planet carrier PT2 in the preset case, in the first planetary gearset P1. The third element E31 in the first planetary gearset P1, in the form of a sun gear SO1 in the present case, is connected to the first element E12, i.e. the sun gear SO2 in the second planetary gearset P2, for conjoint rotation. The other elements in the second planetary gearset remain unchanged.

Unlike in the embodiment in FIG. 2, the torque is input in the embodiment in FIG. 9 via the ring gear HO1 in the first planetary gearset P1, while the output of the first planetary gearset P1 continues to take place via the planet carrier PT1. Unlike in FIG. 2, the two planetary gearsets P1, P2 are connected via a shared sun gear, which is in the form of a shaft 3 in the present case.

Figure 9A:
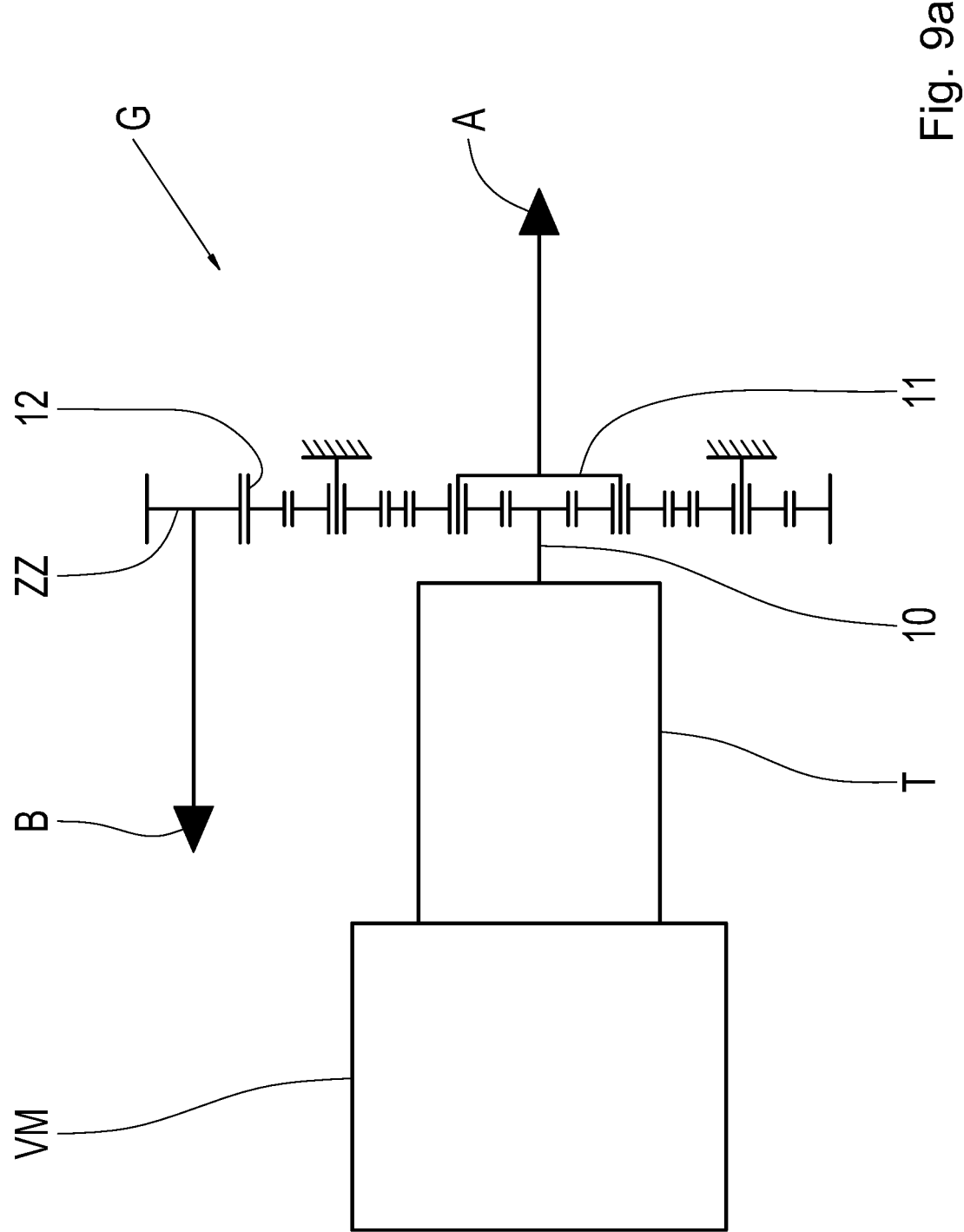

FIG. 9a shows a concrete embodiment of the transmission G for the drive train in FIG. 1c. The output shaft 12 transfers the torque to the rear axle A. The output shaft 11 transfers the torque to the front axle B. As can be readily seen, the axes of the output shafts 11, 12 are parallel to one another, and not coaxial to one another. The second output shaft 12 in the second planetary gearset P2 meshes with the intermediate gearwheel ZZ, which is connected in turn to a shaft, which then inputs the torque to a rear axle differential, not shown.

Figure 10:
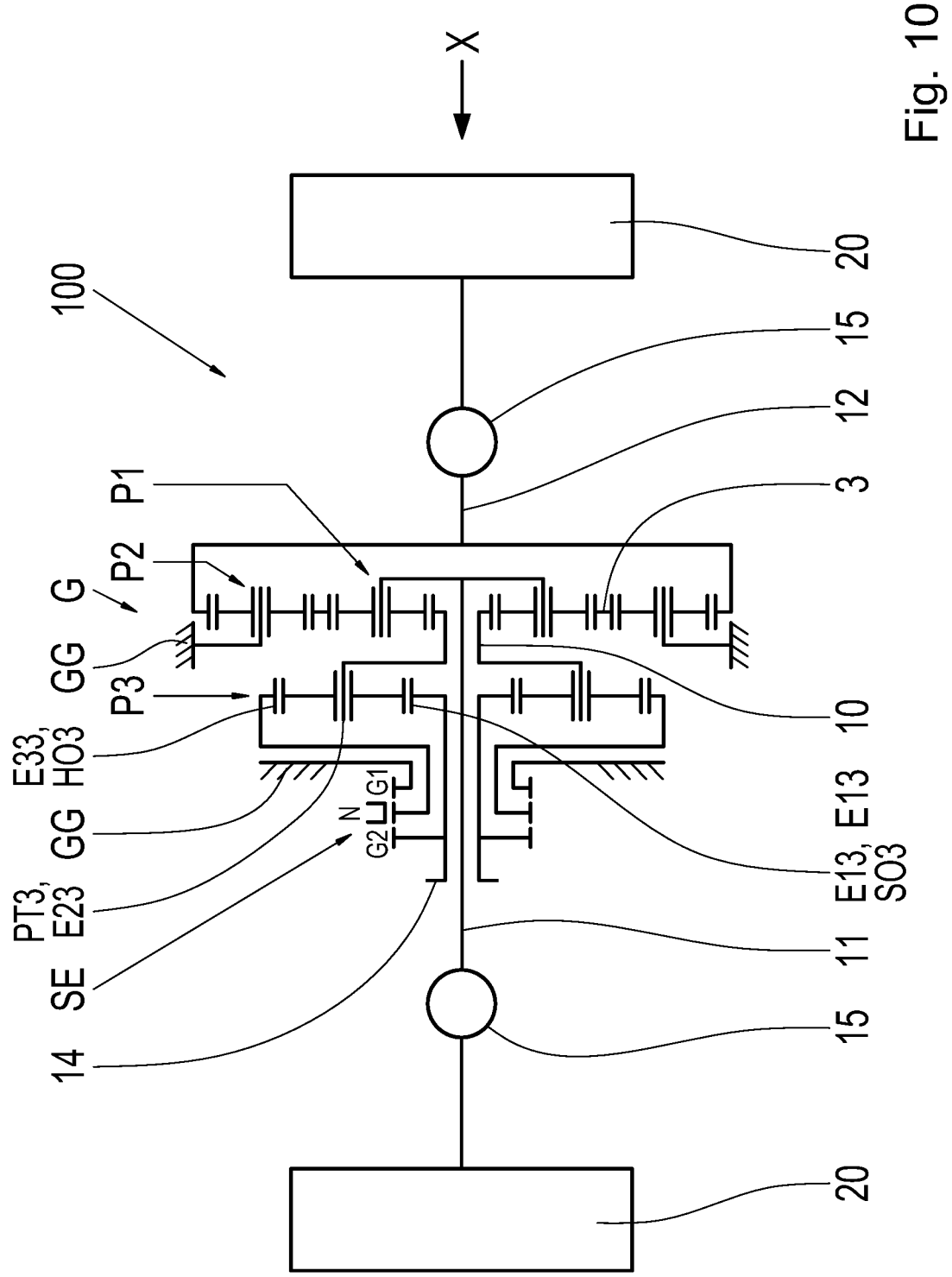
FIGS. 10-13 each show a schematic illustration of a transmission as it can be used in the motor vehicle drive train shown in FIG. 1, in each case in another preferred embodiment.

FIG. 10 shows a drive train 100 for a vehicle that has a transmission in a preferred embodiment, wherein the transmission G also has an upstream step-up gearing in the form of a planetary gearing P3.

The transmission G is the embodiment shown in FIG. 3, to which reference is made here. The planetary gearset P3 is in the form of a negative planetary gearset, and has a first element E13 in the form of a sun gear, a second element E23 in the form of a planet carrier, and a third element E33 in the form of a ring gear. The second element E23 in the third planetary gearset is connected to the input shaft 10 of the transmission G for conjoint rotation.

A shifting element is also assigned to the planetary gearing P3. The shifting element SE is designed to fix the third element E33 in place on the non-rotating component GG. The shifting element SE is also designed to connect the third element E33 to the first element E13 in the third planetary gearset, when in a second shifting position, i.e. to block it. If a planetary gearset is "blocked," the transmission ratio is always 1, regardless of the number of teeth. In other words, the planetary gearset rotates as a block. In a third shifting position, the third element E33 is neither fixed in place on the housing, nor is the planetary gearset P3 blocked. The shifting element SE is in a neutral position in this case.

The first shifting position of the shifting element SE is indicated by the reference symbol G1, which also represents a first gear step. The second shifting position is indicated with the reference symbol G2, which also represents second gear step. The first element E13 in the planetary gearset P3 is connected to a drive machine, not shown, via an input shaft 14. If the shifting element SE is in the neutral setting, the drive torque input to the step-up gearing P3 is not transferred to the input shaft 10 for the transmission G.

As can also be readily derived from FIG. 10, the step-up gearing P3 is coaxial to the input shaft 10 and the output shafts 11, 12. It can also be readily seen how the first output shaft 11 passes through the input shaft 10 in the form of a hollow shaft, and also through the other shaft 14 in the form of a hollow shaft. The two output shafts 11, 12 are each connected to a drive gear 20. There are universal joints 15, which enable wheel movements such as steering movements and/or spring deflections. The shifting element SE is shown here as a form-fitting double-shifting element. Single-shifting elements, in particular powershift elements, are also conceivable.

Figure 11:
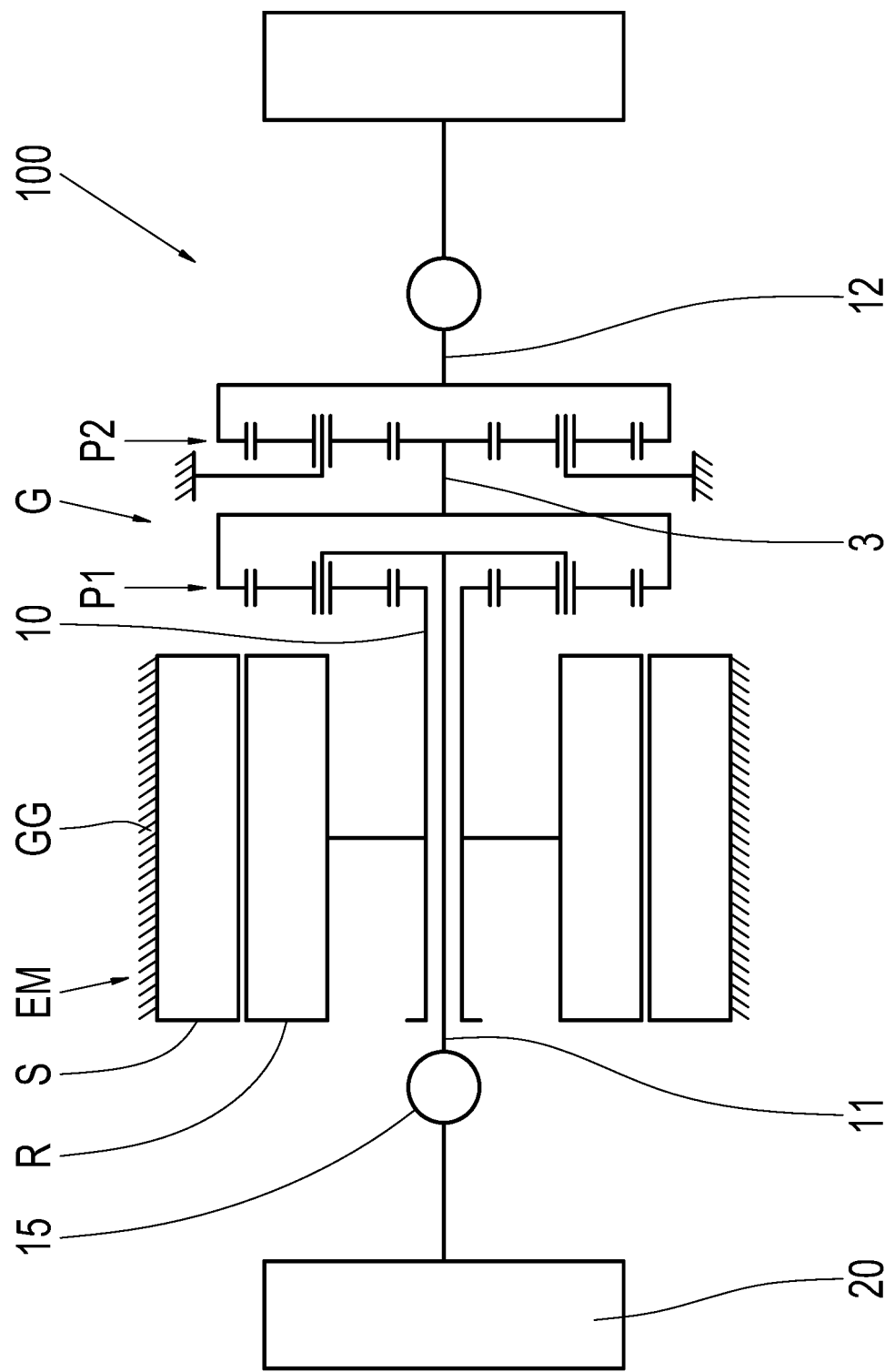

FIG. 11 shows a drive train for a vehicle, with a transmission according to the invention, in another preferred embodiment. The transmission G is the preferred embodiment in FIG. 2, to which reference is made. Unlike in FIG. 10, there is no upstream step-up gearing. The drive machine is in the form of an electric machine EM. The electric machine EM has a stator S and a rotor R in a housing. The rotor R is connected to the input shaft 10 for conjoint rotation. The electric machine EM is coaxial to the input shaft 10 and to the output shafts 11, 12, as can be readily seen. It is also coaxial to the planetary gearsets P1, P2. The input shaft 10 is in the form of a hollow shaft, through which the first output shaft 11 passes. For all other details, reference is made to the explanations regarding FIG. 10.

Figure 12:
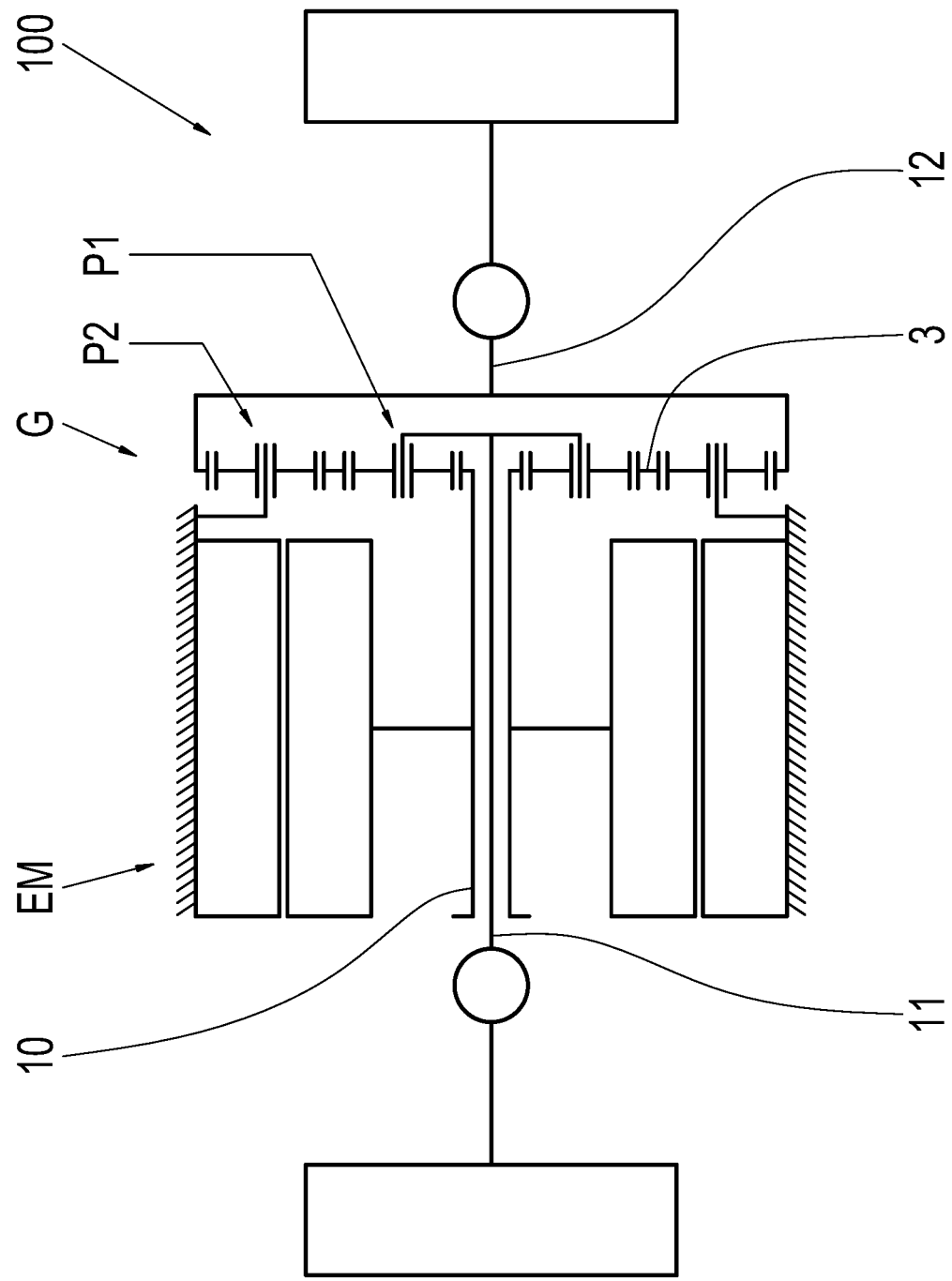

FIG. 12 shows another drive train 100, which has a transmission G, in a preferred embodiment. Unlike the embodiment in FIG. 11, the planetary gearsets P1, P2 are not axially adjacent, but place radially above one another, i.e. nested. The transmission G is therefore the preferred embodiment shown in FIG. 3. For all other details, reference is made to the explanations regarding FIG. 11 and FIG. 3.

Figure 13:
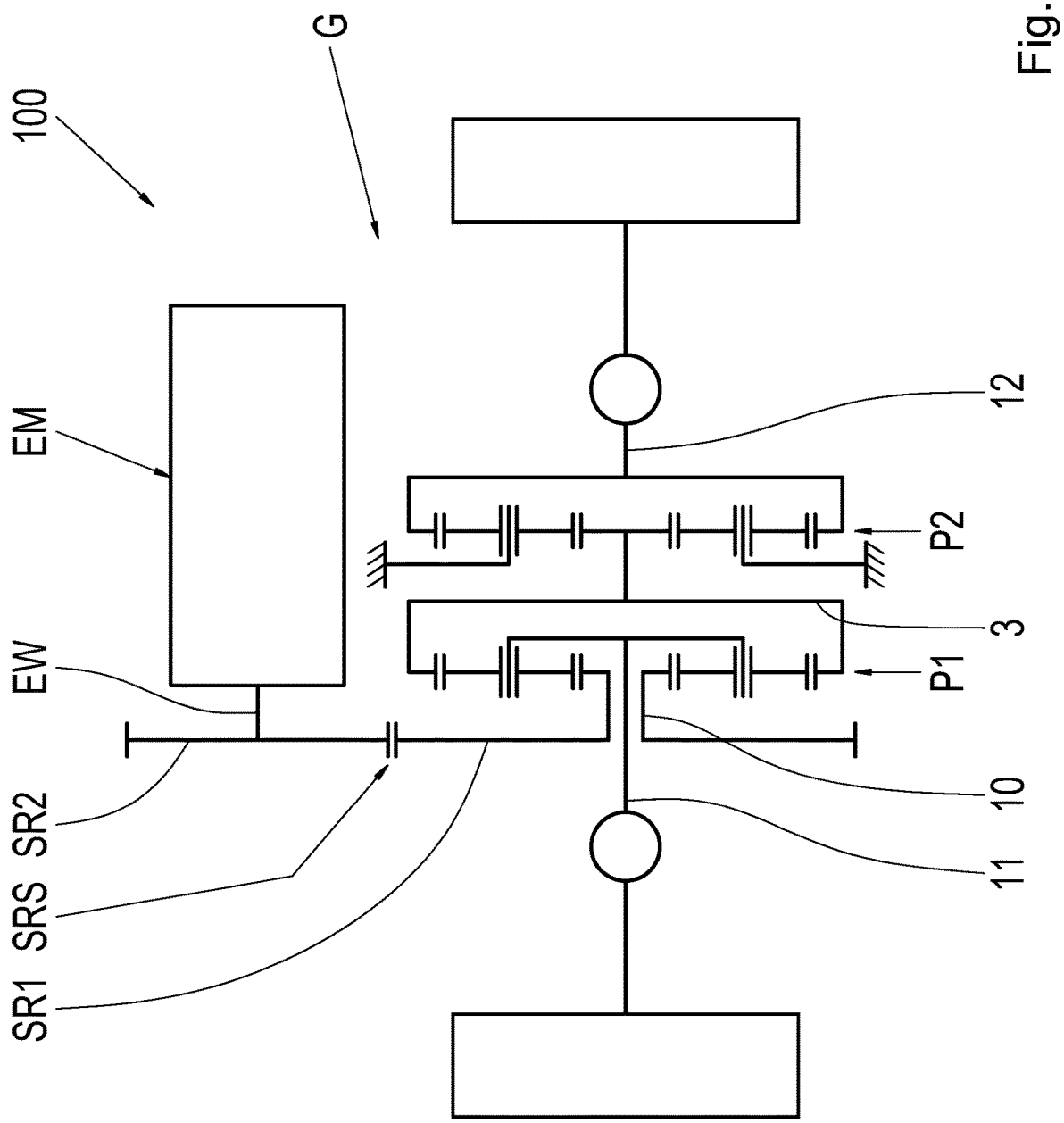

FIG. 13 shows a drive train 100 in another preferred embodiment. This embodiment resembles the embodiment in FIG. 11, with the difference that the axis of the electric machine EM is not coaxial, but parallel to the transmission G. The connection is obtained via a spur gear step SRS, composed of a first spur gear SR1 and a second spur gear SR2. The first spur gear SR1 is connected to the input shaft 10 for conjoint rotation in this case. The first spur gear SR1 then meshes with the second spur gear SR2, which is placed on an input shaft EW for the electric machine EM, for conjoint rotation therewith, which then forms the connection to the rotor in the electric machine EM, which is not shown in the present case.

Otherwise, the embodiment in FIG. 13 corresponds to the that in FIG. 11, such that reference can be made to the descriptions thereof in this regard.

Figure 14:
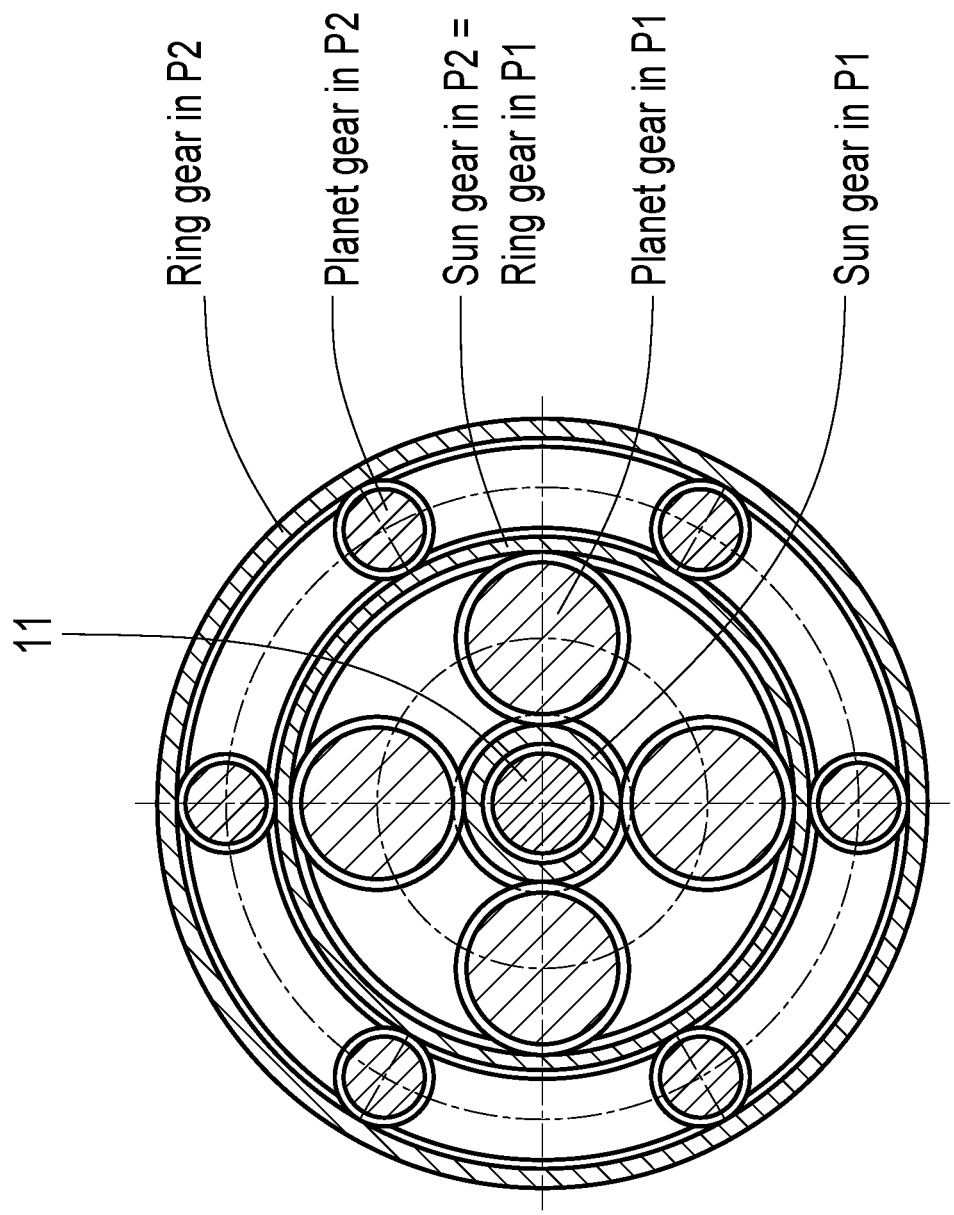
FIG. 14 shows the embodiment shown in FIG. 3 in a cutaway view.

FIG. 14 shows the preferred embodiment of the transmission G in FIG. 3, in a cutaway view. The shaft in the middle is the output shaft 11. The input shaft 10 coincides with the sun gear in P1 in this drawing, i.e. the input shaft 10 is connected to a sun gear in the first planetary gearset P1. The sun gear in the first planetary gearset P1 then meshes with the planet gears in the first planetary gearset P1. The planet gears in the first planetary gearset P1 then mesh with the encompassing ring gear in the first planetary gearset P1, wherein the ring gear also forms the sun gear for the second planetary gearset P2. The sun gear for the second planetary gearset P2 then meshes with the planet gears in the second planetary gearset P2. The planet gears in the second planetary gearset P2 then mesh with the ring gear encircling the planet gears in the second planetary gearset P2.

As can be readily seen, the number of planets in the second planetary gearset is greater than the number of planets in the first planetary gearset. According to this embodiment, the second planetary gearset P2 has six planets, while the first planetary gearset only has four.

A large transmission gear ratio can be obtained with this configuration, which in turn makes it possible to obtain a particularly compact and cost-effective electric machine.

A large transmission gear ratio, according to the calculation rule $$i\_02 = 1/i\_01 - 1$$

results in a smaller standard transmission gear ratio at the second planetary gearset P2. A smaller standard transmission gear ratio then results in smaller planet diameters. Smaller planet diameters result in poorer meshings, and reduce the installation space for the planet bearings.

It has been shown to be the case that a higher number of planets in the second planetary gearset than in the first planetary gearset counteracts this effect.

Figure 16:
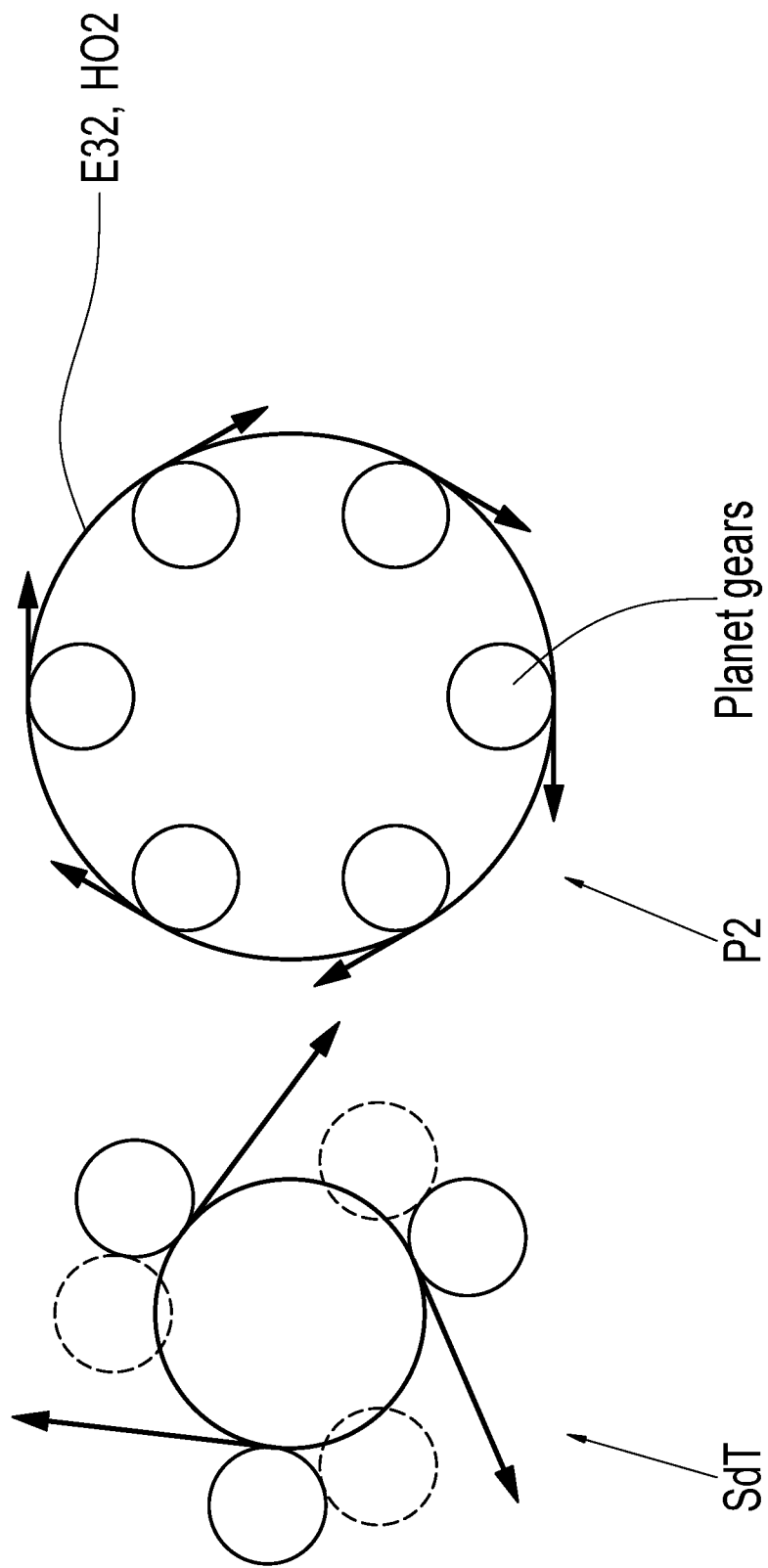

The following FIGS. 15 to 17 show force input and force resistances of the invention in comparison with the prior art, e.g. DE 10 2011 079 975 A1. The prior art is compared with the preferred embodiment that has two negative planetary gearings, such as those described in FIGS. 2 and 3, etc. This also applies accordingly to the other embodiments.

In general, the following applies for FIGS. 15 to 17:

The torque of the input shaft 10 is converted at the first planetary gearset P1 into the output torque for the first output shaft 11. The third element E31 in the first planetary gearset P1 (which is also the first element E12 in the second planetary gearset P2) is driven backwards by its reaction torque. The reverse movement of the third element E31 is allowed, such that a part of the mechanical drive power (preferably 50% in the case of a transverse differential, when driving in a straight line) is conducted through the first planetary gearset P1 into the second planetary gearset.

Furthermore, the transmission ratio to the first output shaft 11 is enlarged by the reverse rotation (standard transmission gear ratio i0=−3 with a stationary ring gear only enables a transmission ratio of i=4).

In the second planetary gearset P2, the direction of rotation (reverse) applied to the first element (E12) is reversed (forwards) in the output drive movement of the second output shaft (12) using the housing resistance (E22). The torque input to the second planetary gearset P2 and the torque obtained from the second output shaft (12) are combined at this point to obtain the housing resistance torque. The second planetary gearset P2 only transfers the portion of the mechanical power conducted to the second output shaft (12) at this point (typically 50%). The second planetary gearset P2 is only subjected to a portion of the power, such that the overall efficiency is influenced in a positive manner.

A torque conversion normally takes place in the prior art with the aid of a housing resistance. The reaction torque of the step-up gearing is conducted directly into the housing in this case, and is not used to generate the second output drive torque. The result is that a transmission for the combined torques of the two output shafts must first be designed (normally twice the torque). A separate differential transmission is subsequently needed in order to divide the combined torque into two output torques, which in this form is never needed.

The individual FIGS. 15 to 18 show, concretely:

FIG. 15 shows, schematically, the first planetary gearset P1 for the transmission G (on the right) and a first step of the spur gear differential from the prior art (on the left). The power input from the planet gears to the sun gear takes place in parallel via 3 stationary, i.e. fixed, gear meshings. The output to the first output shaft takes place via the sun gear.

The power input according to the preferred embodiment takes place, in contrast, in parallel, via eight moving, i.e. rotating, gear meshings. There are four gear meshings between the sun gear SO1 and four planet gears. Four more gear meshings are formed between each planet gear and the ring gear HO1, not shown. The output to the first output shaft 11 takes place via the planet carrier PT1. The technological effect lies in the clearly lower tooth forces acting on the first planetary gearset.

FIG. 16 shows, schematically, the second planetary gearset P2 in the transmission G (on the right) and a second step of the step planets from the prior art (on the left). The power input from the planet gears to the sun gear takes place in parallel via 3 stationary, i.e. fixed, gear meshings. The output to the second output shaft takes place via the sun gear.

The power input to the second planetary gearset P2 according to the preferred embodiment takes place, in contrast, in parallel, via 6 moving, i.e. rotating, gear meshings. The six gear meshings each act between one of the six planet gears and the ring gear HO2. The fixed planet carrier PT2, which support the six planet gears and the sun gear SO2, is not shown. The output to the second output shaft 12 takes place via the ring gear HO2. The technological effect lies in the significantly lower gear forces obtained due to the larger effective diameter and due to the larger possible number of planets in the second planetary gearset.

FIG. 17 shows, schematically, the input of the resistance torque into the housing. The power input with stepped planets according to the prior art (on the left) takes place via 3 parallel gear meshings in a stationary ring gear.

The power input according to the preferred embodiment takes place via 12 parallel gear meshings in the stationary planet carrier PT2. Six gear meshings act between the sun gear SO2 and the six planet gears in the second planetary gearset. The other six gear meshings act between each planet gear in the second planetary gearset and the ring gear HO2. The technological effect lies in the significantly lower gear forces acting on the second planet carrier PT2.

Figure 18:
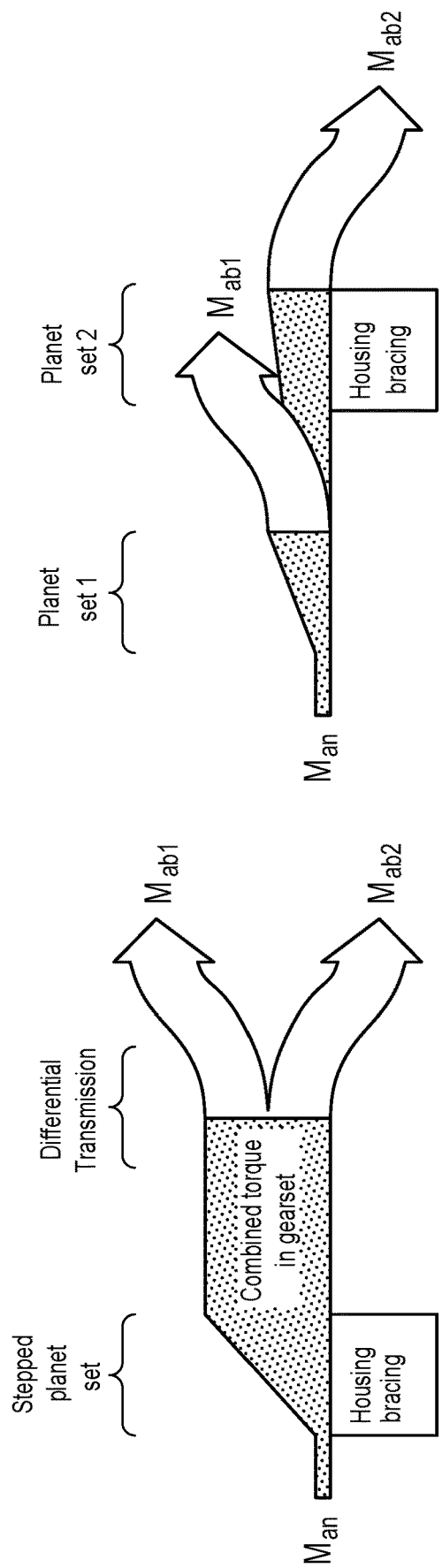

FIG. 18 shows the principle shown in greater detail in FIGS. 15 to 17 in another perspective.

The greatest torque in the gearset according to the invention (on the right) corresponds to the output torque for a single wheel. Only the housing resistance has a physical effect resulting in a high torque factor.

The stepped planetary gearset according to the prior art (on the left) generates the entire output torque from an input torque Man, i.e. the combined torque for both wheels. The differential divides this high torque into two half wheel torques Man1 and Man2.

The paths of the torques are illustrated symbolically in the drawing. The directions of rotation cannot be derived therefrom.

FIG. 19 shows an overview of the calculating rule for the standard transmission gear ratios for the individual embodiments. These result in equal torques, ignoring the transmission losses, and have the same symbol (+, −) at both output shafts 11, 12. i01 indicates the standard transmission gear ratio for the first planetary gearset P1. i02 indicates the standard transmission gear ratio for the second planetary gearset P2. Depending on the use of the transmission, one of the planetary gearset configurations can be selected with a corresponding standard transmission gear ratio.

FIGS. 20a-20d show embodiments of the axial support 30 for the shaft 3 in a schematic illustration.

The transmission gearsets used in FIGS. 20(a-d) to 26 correspond to the transmission gearset shown in FIGS. 3 and 12. This is the embodiment in which the first and second planetary gear sets are placed radially above one another. At this point it should be noted that the axial placement of the shaft 3, according to the invention, in the any of the embodiments in FIGS. 2 to 13 can be used.

With regard to the structural embodiment of the transmission G shown in FIG. 20, reference is made to the description of FIG. 3. With regard to the connection of the electric machine EM to the input shaft 10, reference is made to the embodiment in FIG. 12.

Figure 20D:
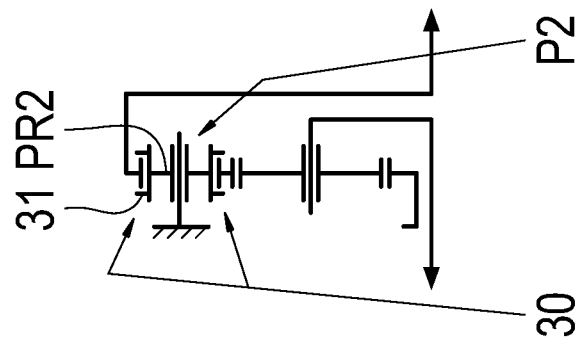
FIGS. 20a-20d show an overview of the various possibilities for supporting the shafts on the planet gears of the transmission (G)
Figure 20C:
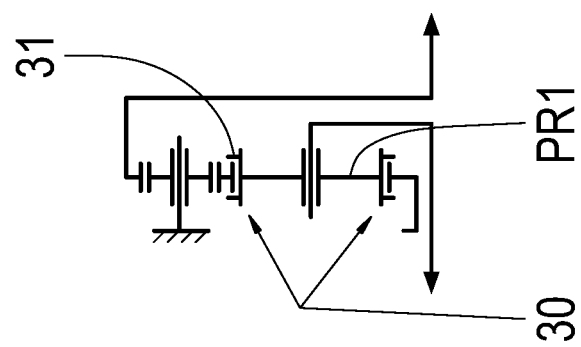
Figure 20B:
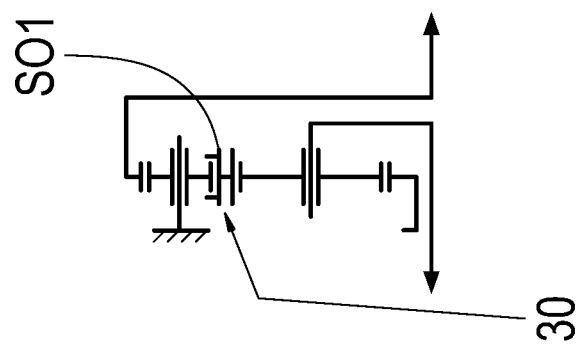
Figure 20A:
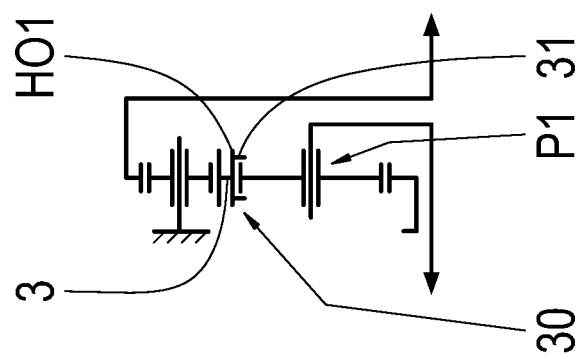

A preferred bearing 30, placed on the inner gear teeth of the ring gear HO1, is shown in FIG. 20a. The thrust elements 31 are placed on the radially inner side of the ring gear HO1 in the first planetary gearset P1. This has the advantage that without a special centrifugal force safeguard, snap rings or locking washers can be used. Furthermore, the radially inner planetary gearset diameter in this variation is the larger of the two. This makes it possible to obtain a small speed differential in the contact surface, despite the radial spacing between the contact surface and pitch point.

The contact surface is the surface on the thrust element 31 at which the two corresponding gearwheels are braced against one another when an axial force is applied. Because one path is normally conical and the other path is conical with an overlapping camber, a contact point is obtained where they touch one another (with an ideal stiffness). The individual slip speeds (simplified as the slip speed at the contact point) is decisive with regard to the losses.

The pitch point of two gearwheels in a pair is the point at which the speed vectors of the two gearwheels are identical. From a spatial perspective, this forms a straight line.

The thrust elements 31 are located on the radially outside of the sun gear SO2 in FIG. 20b.

The thrust elements 31 are located on at least one planet gear PR1 in the first planetary gearset P1 in FIG. 20c.

The thrust elements 31 are located on at least one planet gear PR2 in the second planetary gearset P2 in FIG. 20d.

When the thrust surfaces are located on the planet gears PR1 and PR2, as is the case in FIGS. 20c and 20d, it is also possible to brace against axial forces of the sun gear SO1 and the ring gear HO2. The widths of the teeth can also be selected such that such a bracing effect does not occur.

Figure 21:
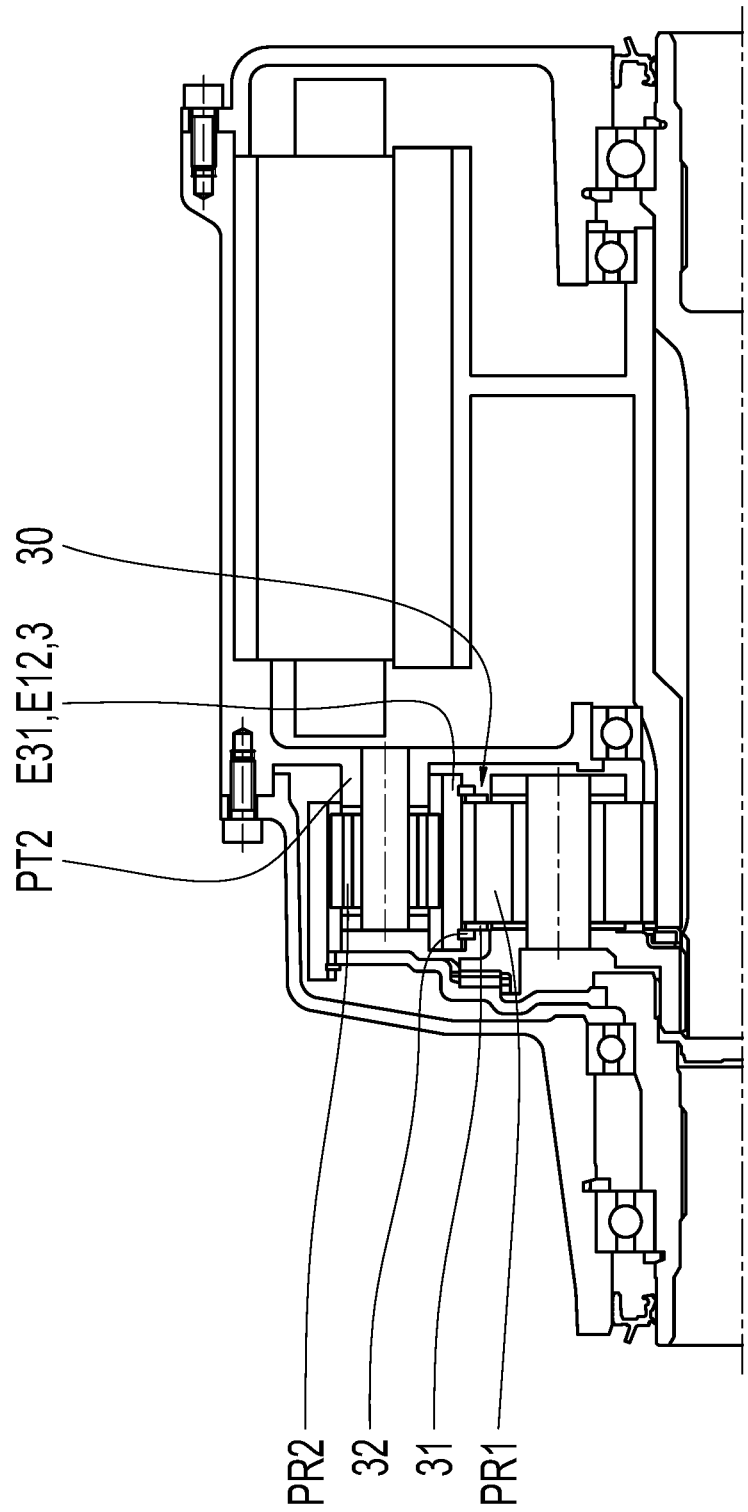

FIG. 21 shows the preferred ring gear bearing 30 from FIG. 20a. As can be seen, the ring gear HO1, shaft 3, and sun gear SO2, forming an integral component, are never supported with respect to the housing or a coaxial shaft. Instead, they are supported radially by their being centered in the planet gears PR2 in the outer planetary gearset P2. In other words, the planet gears PR2 on the fixed planet carrier PT2 center the shaft 3. The axial support of the shaft 3 is obtained by the support of one of the thrust element 31 in the form of a thrust washer and connected to the shaft 3, on the planet gears PR1 of the inner planetary gearset P1. The thrust washer 31 is held in place by means of a locking washer 32.

FIGS. 22 to 25 show possible embodiments of the thrust elements.

Figure 22:
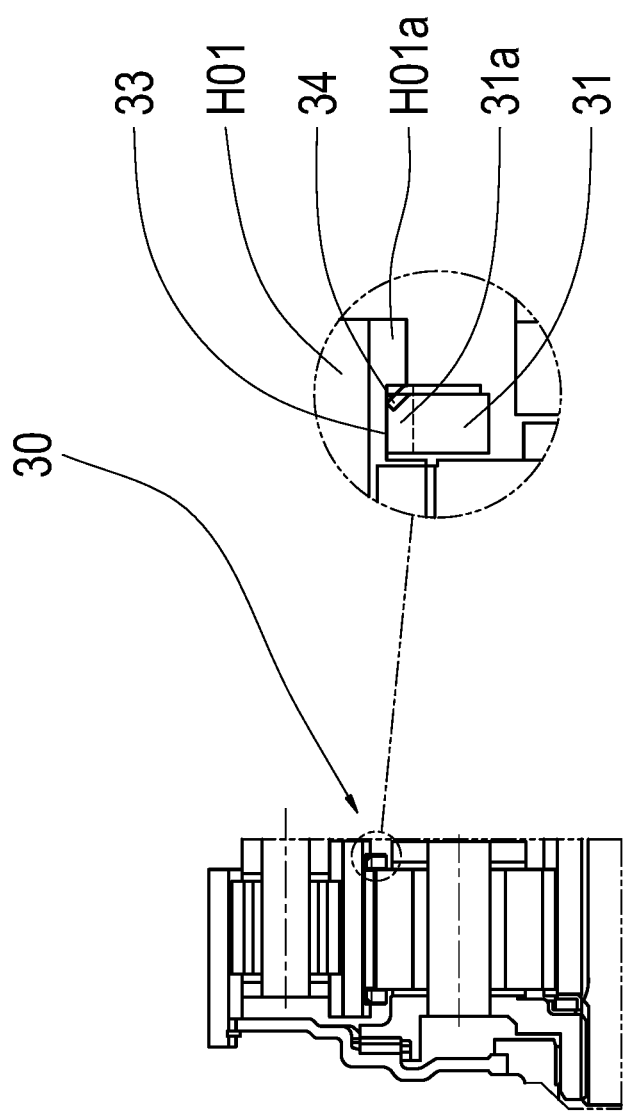

FIG. 22 shows a thrust element 31 in the form of a thrust collar, which has a gearing 31a, by means of which the thrust collar is slid through the gearing HO1a of the ring gear HO1 until reaching a groove 33. The groove 33 encircles the gearing HO1a of the ring gear HO1 radially. The thrust collar is twisted a certain amount in this groove 33, which in this case corresponds to one half of the tooth width. There is also a securing element 34 in the form of a plate, which prevents a turning of the thrust collar such that it falls out.

The locking plate 34 is placed therewith in the groove 33 and bent during the installation such that the thrust collar remains locked or fixed in its angular position. The bending is caused during the installation process by an installation tool designed for this. This embodiment forms a particular robust solution and is then particularly advantageous when high axial forces are to be transferred via the thrust element 31. This may be the case, for example, when it is not possible to design the gear teeth, in the case of very high loads to the transmission, such that the axial forces are counterbalanced. This may be the case when an additional torque is applied to the shaft 3, e.g. by a torque-vectoring unit attached thereto. Instead of the locking plate 34, other embodiments are conceivable for preventing the thrust element 31 from turning back in the groove. These can comprise, e.g., bolts, pins, or other locking elements.

The thrust surface is slightly conical, and one of the thrust partners, i.e. the thrust element 31 or the planet gear PR1, which is also conical, is also cambered. This enables the formation of a good lubricant film, and axial force transfer, with only slight drag torques.

Figure 23:
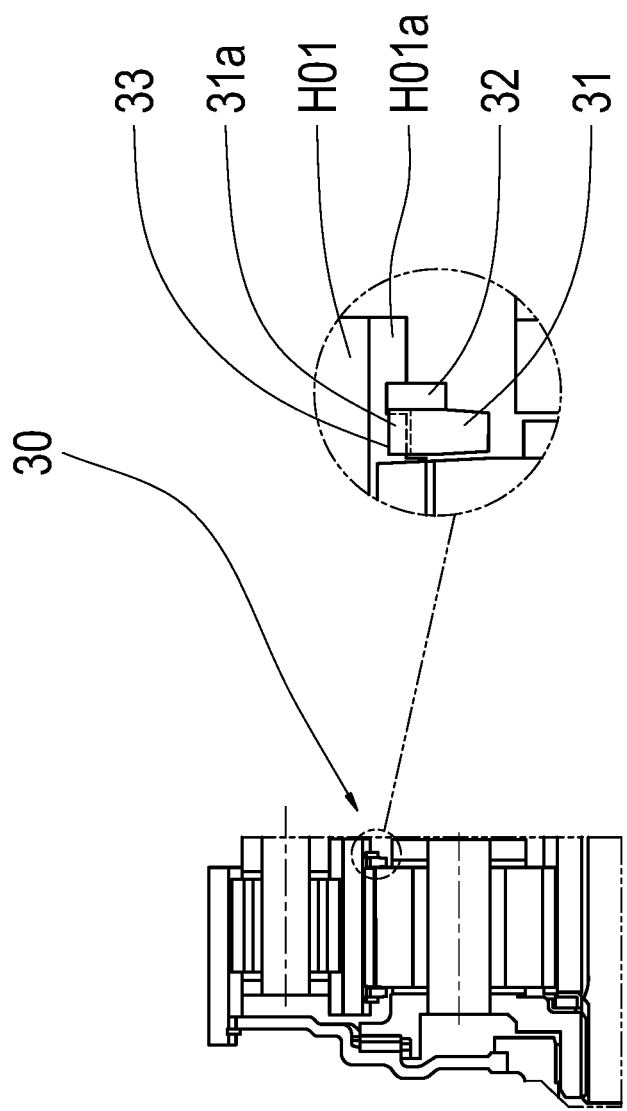

The embodiment shown in FIG. 23, like that in FIG. 22, also has a thrust element 31 with gear teeth 31a, which is slid through the gearings HO1a until reaching a step. In this embodiment, only the locking element 32 is located in the groove.

Unlike in FIG. 22, the thrust element 31 is not twisted. Instead, a locking washer 32 or snap ring is placed between the thrust surface. The advantage with this embodiment is that the thrust collar is always centered in the gearing, and cannot rotate therewith.

In this embodiment, both sides of the thrust element 31 are conical. The advantage of this is that it is difficult to see the conical-ness with the naked eye, thus preventing errors during assembly. The thrust ring 31 can thus be inserted from both of its two sides.

Figure 24:
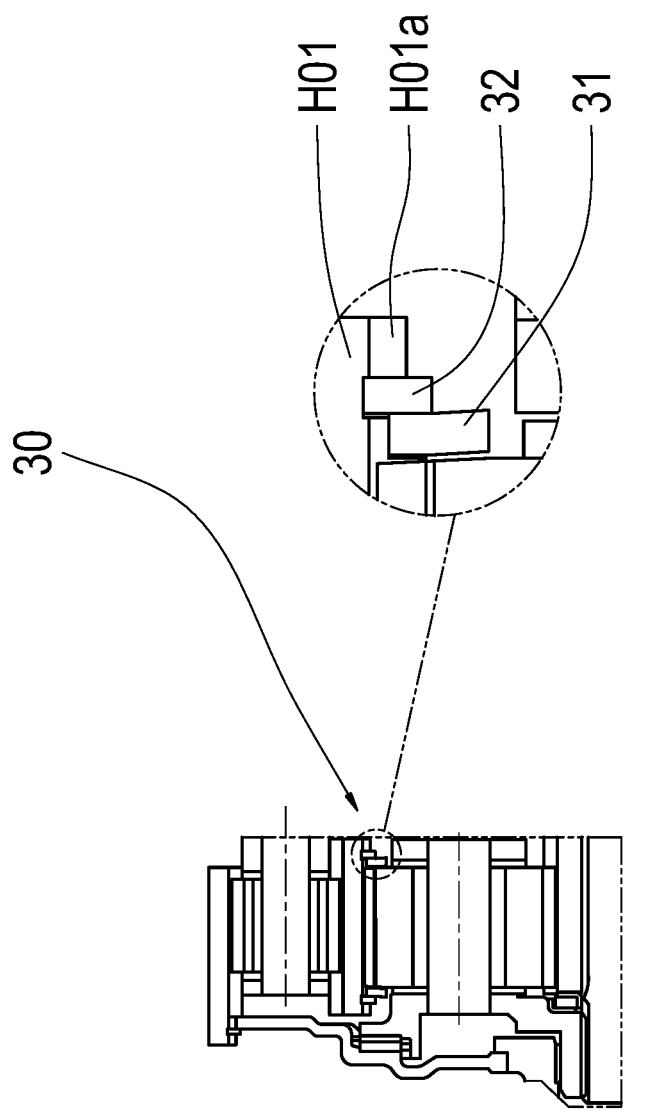

In the embodiment in FIG. 24, the thrust element 31 is formed as a flexible sheet metal part. A locking washer 32 or snap ring secures the thrust element 31 in place in the axial direction. The embodiment is preferable for low axial forces, such that there is no need for a safeguard against twisting. In this embodiment, slight rotation, i.e. slight movement of the thrust element 31 is tolerated. In other words, there is no need for teeth on the thrust element.

Figure 25:
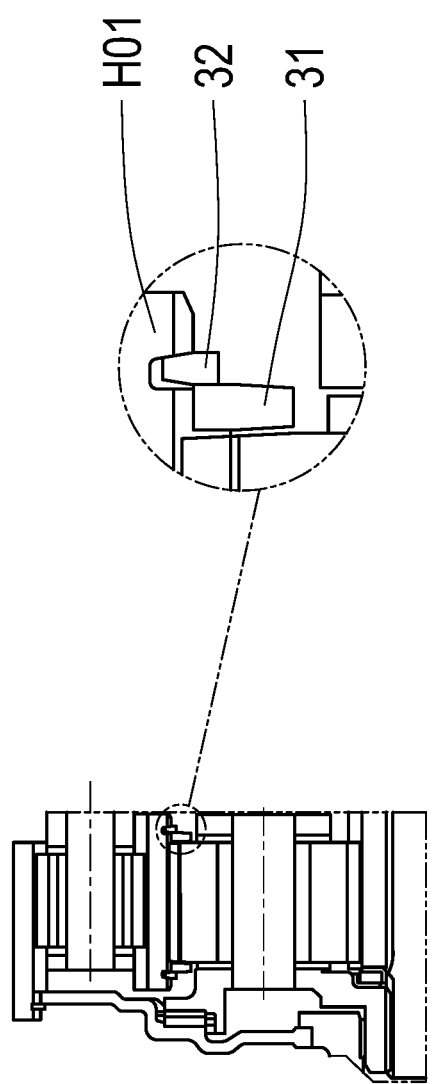

FIG. 25 shows another preferred embodiment with a thrust collar 31 and a locking washer 32. The particular advantage with this embodiment is that lower tolerances are required for the thrust collar 31. The thrust collar 31, i.e. the ring, is produced by a shaping process. By way of example, geometrical warpage of the component during a heat treatment can be tolerated, because the thrust collar has very thin walls, and regains it round shape in the installed state by the outer seating in the ring gear HO1, and is pressed flat, without play, at the end facing the axial bearing surface on the ring gear HO1 by the conical snap ring 32. There is therefore no need for precise post-processing, such as sanding, e.g. after a heat treatment. Both rings, i.e. both the thrust collar 31 as well as the locking washer 32 have two symmetrical, conical contours, thus ensuring that they cannot be installed in the wrong direction.

In the embodiment in FIG. 26, the snap ring 32 itself is the thrust element 31. This embodiment is particularly well suited for very low axial forces. The thrust surfaces on the thrust element 31 are flat. The end surfaces of the planet gears PR1 are conical. This is an extremely cost-effective solution. In comparison with the aforementioned, this is the most cost-effective solution. The embodiment can be formed with a ring that is conical on one side (FIGS. 22, 24) or on both sides (FIGS. 23, 25), and camber on one of the thrust partners.

The invention is comprehensively described and explained in reference to the drawings and the description. The description and explanation are to be understood being by way of example, and not as limiting. The invention is not limited to the disclosed embodiments. Other embodiments or variations can be derived by the person skilled in the art when using the invention, as well as with a precise analysis of the drawings, the disclosure, and the following claims.

In the claims, the words "comprising" and "having" do not exclude the presence of other elements of steps. The indefinite articles "a" or "an" do not exclude the presence of a plurality. A single element or a single unit may execute the functions of numerous units specified in the claims. The simple specification of some measures in numerous different dependent claims is not to be understood to mean that a combination of these measures may not also be advantageously used.

REFERENCE SYMBOLS

G transmission
GG non-rotating component, housing
E11 first element of the first planetary gearset
E21 second element of the first planetary gearset
E31 third element of the first planetary gearset
E12 first element of the second planetary gearset
E22 second element of the second planetary gearset
E32 third element of the second planetary gearset
E13 first element of the third planetary gearset
E23 second element of the third planetary gearset
E33 third element of the third planetary gearset
P1 first planetary gearset
P2 second planetary gearset
P3 third planetary gearset
PR1 planet gear in the first planetary gearset
PR2 planet gear in the second planetary gearset
SO sun gear
PT planet carrier
HO ring gear
EM electric machine
S stator
R rotor
EW input shaft of the electric machine
SRS spur gear step
SR1 first spur gear
SR2 second spur gear
SE shifting element
G1 first shifting position, first gear step
G2 second shifting position, second gear step
N neutral position
VM internal combustion engine
A vehicle axle, rear
B vehicle axle, front
3 shaft
10 input shaft
11 first output shaft
12 second output shaft 15 joint
20 wheels
30 bearing, axial bearing
31 thrust element, thrust collar
32 locking washer, snap ring
33 groove
34 locking plate
99 direction of travel, forwards
100 drive train
1000 vehicle
i01 standard transmission gear ratio for the first planetary gearset
i02 standard transmission gear ratio for the second planetary gearset

The invention claimed is:

1. A transmission comprising:
an input shaft,
a first output shaft,
a second output shaft, a first planetary gearset, and
a second planetary gearset connected to the first planetary gearset,
wherein the input shaft, the first and second output shafts, the first and second planetary gearsets are arranged and designed such that:
a torque input via the input shaft is converted and distributed in a defined ratio to the first and second output shafts, and
formation of a combined torque is prevented,
wherein at least a third element of the first planetary gearset is connected to a first element of the second planetary gearset with a shaft for conjoint rotation, and
a second element of the second planetary gearset is fixed in place on a non-rotating component,
wherein the shaft is positioned axially on at least one planet gear of one of the first and second planetary gearsets, and
wherein an axial positioning of the shaft is obtained via at least one thrust element in a form of a thrust collar such that an axial support of the shaft is obtained through thrust applied to the at least one planet gear of one of the first and second planetary gearsets.

2. The transmission according to claim 1, wherein
the input shaft is connected to a first element of the first planetary gearset for conjoint rotation;
the first output shaft is connected to a second element of the first planetary gearset for conjoint rotation; and
the second output shaft is connected to a third element of the second planetary gearset for conjoint rotation.

3. The transmission according to claim 1, wherein a pitch of a gearing of the third element of the first planetary gearset and a pitch of a gearing of the first element of the second planetary gearset have a same value and a same sign.

4. The transmission according to claim 1, wherein the shaft is positioned axially exclusively on at least one planet gear.

5. The transmission according to claim 1, wherein a radial support of the shaft is obtained exclusively by at least one planet gear in one of the first and second planetary gearsets.

6. The transmission according to claim 1, wherein there are no further shaft connections on the shaft, such that a torque from a first number of planet gears in the first planetary gearset input to the third element of the first planetary gearset is also conducted via the first element of the second planetary gearset to a second number of planet gears in the second planetary gearset.

7. The transmission according to claim 1, wherein the thrust element is located on
the third element of the first planetary gearset, or
the first element of the second planetary gearset, or
at least one planet gear of the first planetary gearset, or
at least one planet gear of the second planetary gearset.

8. The transmission according to claim 1, wherein the thrust element is located on
an inner gearing of one of the third elements of one of the two planetary gearsets, or
an outer gearing
of the first element of one of the two planetary gearsets, or
a planet gear of one of the two planetary gearsets.

9. The transmission according to claim 8, wherein the third element is a ring gear, and the first element is a sun gear.

10. The transmission according to claim 8, wherein the thrust element has gear teeth, designed such that it can be slid over or through corresponding gear teeth.

11. The transmission according to claim 1, wherein the thrust element is twisted in an operating situation in relation to a corresponding gear teeth and in relation to an assembly position in a groove to a defined extent.

12. The transmission according to claim 1, wherein a twisting back of the thrust element is prevented by a collar component in a groove in the thrust element.

13. The transmission according to claim 1, wherein the thrust element is axially secured in place by a locking washer or snap ring.

14. The transmission according to claim 1, wherein the thrust element is cylindrical on a side where associated gear teeth are located.

15. The transmission according to claim 1, wherein the thrust element is secured against twisting in associated gear teeth.

16. The transmission according to claim 1, wherein the thrust element has
a conical thrust surface on at least one side, or
a flat thrust surface on at least one side.

17. The transmission according to claim 1, wherein the thrust element forms a snap ring.

18. The transmission according to claim 1, wherein an element that is designed to bear against the thrust element is conical or cambered on a thrust surface.

19. A drive train that has a transmission according to claim 1.

* * * * *